US011893784B2

(12) United States Patent
Zagaynov et al.

(10) Patent No.: US 11,893,784 B2
(45) Date of Patent: Feb. 6, 2024

(54) ASSESSMENT OF IMAGE QUALITY FOR OPTICAL CHARACTER RECOGNITION USING MACHINE LEARNING

(71) Applicant: ABBYY Development Inc., Dover, DE (US)

(72) Inventors: Ivan Zagaynov, Moscow Region (RU); Dmitry Rodin, Saratovkaya (RU); Vasily Loginov, Moscow (RU)

(73) Assignee: ABBYY Development Inc., Dover, DE (US)

( * ) Notice: Subject to any disclaimer, the term of this patent is extended or adjusted under 35 U.S.C. 154(b) by 429 days.

(21) Appl. No.: 17/303,128

(22) Filed: May 20, 2021

(65) Prior Publication Data

US 2022/0366179 A1 Nov. 17, 2022

(30) Foreign Application Priority Data

May 14, 2021 (RU) .......................... RU2021113767

(51) Int. Cl.
*G06V 10/98* (2022.01)
*G06V 10/50* (2022.01)
(Continued)

(52) U.S. Cl.
CPC .......... *G06V 10/993* (2022.01); *G06F 18/214* (2023.01); *G06F 18/2163* (2023.01);
(Continued)

(58) Field of Classification Search
CPC ...... G06V 10/993; G06V 10/32; G06V 10/50; G06V 10/806; G06V 30/10; G06V 10/44;
(Continued)

(56) References Cited

U.S. PATENT DOCUMENTS 9,317,764 B2 4/2016 Baheti et al.
9,412,030 B2 8/2016 Bocharov et al.
(Continued)

FOREIGN PATENT DOCUMENTS

CN 107480671 A 12/2017
CN 109215028 1/2019
(Continued)

OTHER PUBLICATIONS

Rodin, Dmitry et al., "Fast Glare Detection on Document Images", R&D Department ABBYY Production LLC, Moscow, Russia, Institute of Physics and Technology (NationalResearch University), Moscow, Russia, Aug. 2020, 4 pages.
(Continued)

*Primary Examiner* — Siamak Harandi
(74) *Attorney, Agent, or Firm* — Lowenstein Sandler LLP

(57) ABSTRACT

Aspects of the disclosure provide for systems and processes for assessing image quality for optical character recognition (OCR), including but not limited to: segmenting an image into patches, providing the segmented image as an input into a first machine learning model (MLM), obtaining, using the first MLM, for each patch, first feature vectors representative of a reduction of imaging quality in a respective patch, and second feature vectors representative of a text content of the respective patch, providing to a second MLM the first feature vectors and the second feature vectors, and obtaining, using the second MLM, an indication of suitability of the image for OCR.

21 Claims, 13 Drawing Sheets

(51) Int. Cl.
*G06N 20/00* (2019.01)
*G06N 5/04* (2023.01)
*G06V 10/32* (2022.01)
*G06V 30/10* (2022.01)
*G06F 18/214* (2023.01)
*G06F 18/21* (2023.01)
*G06V 10/80* (2022.01)

(52) U.S. Cl.
CPC .............. *G06N 5/04* (2013.01); *G06N 20/00* (2019.01); *G06V 10/32* (2022.01); *G06V 10/50* (2022.01); *G06V 10/806* (2022.01); *G06V 30/10* (2022.01)

(58) Field of Classification Search
CPC ... G06V 10/26; G06F 18/214; G06F 18/2163; G06N 5/04; G06N 20/00; G06N 3/045; G06N 3/0464; G06N 3/09
See application file for complete search history.

(56) References Cited

U.S. PATENT DOCUMENTS

| | | |
|---|---|---|
| 9,626,582 B2 | 4/2017 | Beato |
| 9,811,885 B2 | 11/2017 | Bocharov et al. |
| 10,402,677 B2 | 9/2019 | Zhai et al. |
| 10,607,330 B2 | 3/2020 | Kompalli et al. |
| 10,630,905 B2 | 4/2020 | Mondal et al. |
| 10,659,682 B2 | 5/2020 | Sivan |
| 10,691,984 B2 | 6/2020 | Loginov et al. |
| 2009/0067726 A1 | 3/2009 | Erol et al. |
| 2009/0141932 A1 | 6/2009 | Jones et al. |
| 2014/0168478 A1 | 6/2014 | Baheti et al. |
| 2016/0188993 A1 | 6/2016 | Beato |
| 2017/0293818 A1 | 10/2017 | Zagaynov et al. |
| 2020/0143519 A1* | 5/2020 | Gordon ................. G06T 7/11 |

FOREIGN PATENT DOCUMENTS

| | | |
|---|---|---|
| RU | 2634195 C1 | 10/2017 |
| RU | 2721187 C1 | 5/2020 |
| WO | 2018080546 A1 | 5/2018 |

OTHER PUBLICATIONS

Hradis, Michal et al. "Convolutional Neural Networks for Direct Text Deblurring", DOI:https://dx.doi.org/10.5244/C.29.6, pp. 6.1-6.13.

Chernov, T.S., "Glare Detection and Filtering in Document Recognition Tasks on Mobile Devices", Proceeding of the ISA RAS. vol. 67.1 / 2017, pp. 66-74.

* cited by examiner

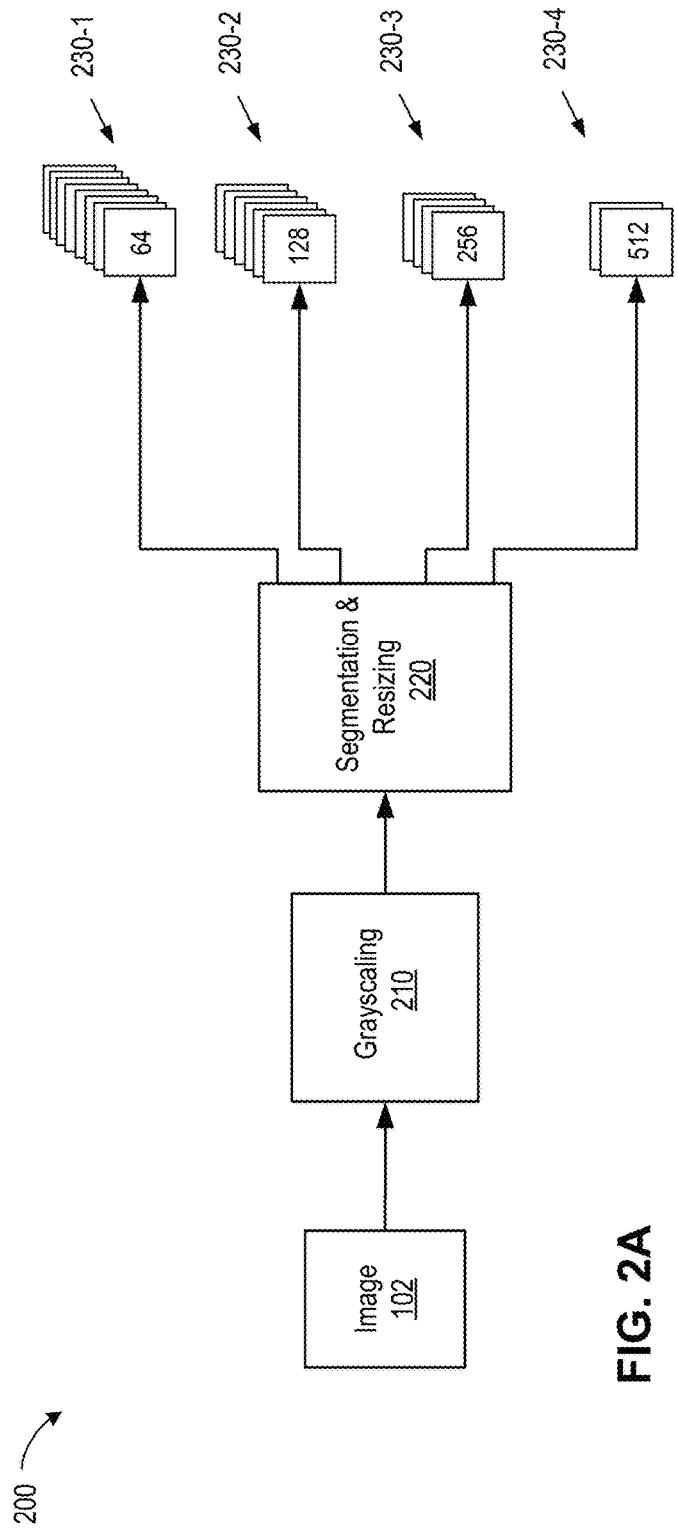
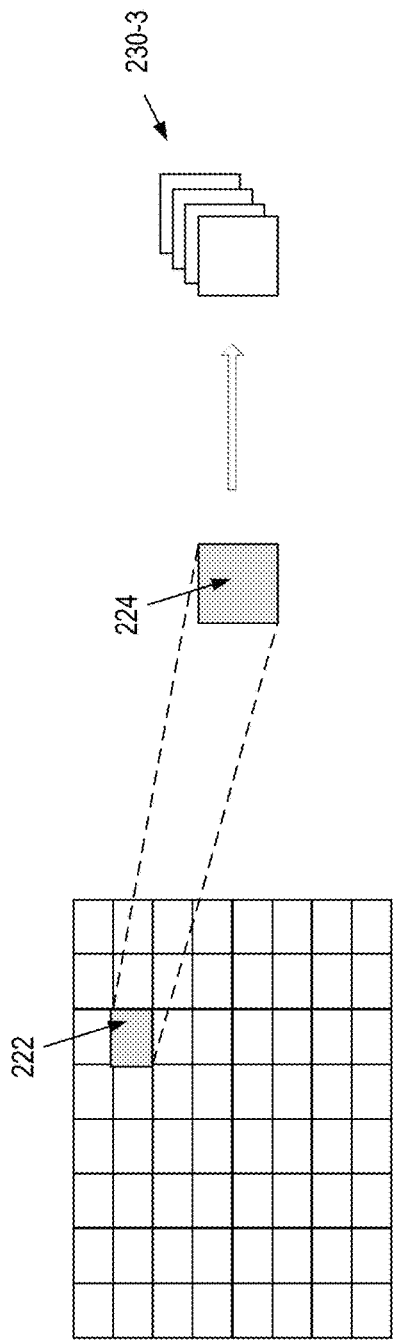
FIG. 2A
FIG. 2B

ASSESSMENT OF IMAGE QUALITY FOR OPTICAL CHARACTER RECOGNITION USING MACHINE LEARNING

RELATED APPLICATIONS

This application claims the benefit of priority under 35 USC 119 to Russian patent application No. RU2021113767, filed May 14, 2021, the entire contents of which are incorporated herein by reference.

TECHNICAL FIELD

The implementations of the disclosure relate generally to computer systems and, more specifically, to systems and methods for evaluating quality of images and fitness of images for optical character recognition.

BACKGROUND

Optical character recognition is used for extracting content from images of documents that are not available in a structured electronic form. Content extracted from images often contains text data, such as words, letters, numerals, and the like. An image taken by a camera is sometimes denoised and processed by a neural network that recognizes symbols, words, phrases and sentences, and identifies the text contained in the image. Successful character recognition and text identification depend on the quality of the images. Images of a poor quality often leading to failures, including instances of unrecognized or misrecognized text.

SUMMARY OF THE DISCLOSURE

Implementations of the present disclosure describe mechanisms for evaluating suitability of images for optical character recognition.

A method of the disclosure includes: segmenting an image to obtain a plurality of patches, providing the segmented image as a first input into a first machine learning model (MLM), obtaining, using the first MLM, for each patch of the plurality of patches, one or more first feature vectors representative of reduction of imaging quality in a respective patch, and one or more second feature vectors representative of a text content of the respective patch, providing a second input into a second MLM, the second input comprising, for each patch of the plurality of patches, the one or more first feature vectors and the one or more second feature vectors, and obtaining, using the second MLM, an indication of suitability of the image for optical character recognition.

A non-transitory machine-readable storage medium of the disclosure includes instructions that, when accessed by a processing device, cause the processing device to: segment an image to obtain a plurality of patches, provide the segmented image as a first input into a first MLM, obtain, using the first MLM, for each patch of the plurality of patches: one or more first feature vectors representative of reduction of imaging quality in a respective patch, and one or more second feature vectors representative of a text content of the respective patch, provide a second input into a second MLM, the second input comprising, for each patch of the plurality of patches, the one or more first feature vectors and the one or more second feature vectors, and obtain, using the second MLM, an indication of suitability of the image for OCR.

A system of the disclosure includes a memory, and a processing device operatively coupled to the memory, the processing device to: segment an image to obtain a plurality of patches, provide the segmented image as a first input into a first MLM, obtain, using the first MLM, for each patch of the plurality of patches: one or more first feature vectors representative of reduction of imaging quality in a respective patch, and one or more second feature vectors representative of a text content of the respective patch, provide a second input into a second MLM, the second input comprising, for each patch of the plurality of patches, the one or more first feature vectors and the one or more second feature vectors, and obtain, using the second MLM, an indication of suitability of the image for OCR.

BRIEF DESCRIPTION OF THE DRAWINGS

The disclosure will be understood more fully from the detailed description given below and from the accompanying drawings of various implementations of the disclosure. The drawings, however, should not be taken to limit the disclosure to the specific implementations, but are for explanation and understanding only.

FIGS. 2A-2B illustrate an example preprocessing of an image for assessment of suitability of the image for optical character recognition, in accordance with some implementations of the present disclosure. FIG. 2A is a block diagram of an example preprocessing of an image that is used as input into a first MLM. FIG. 2B illustrates a single-step resizing in which rectangular patches of image are resized directly into square patches of a target size.

DETAILED DESCRIPTION

Figure 1:
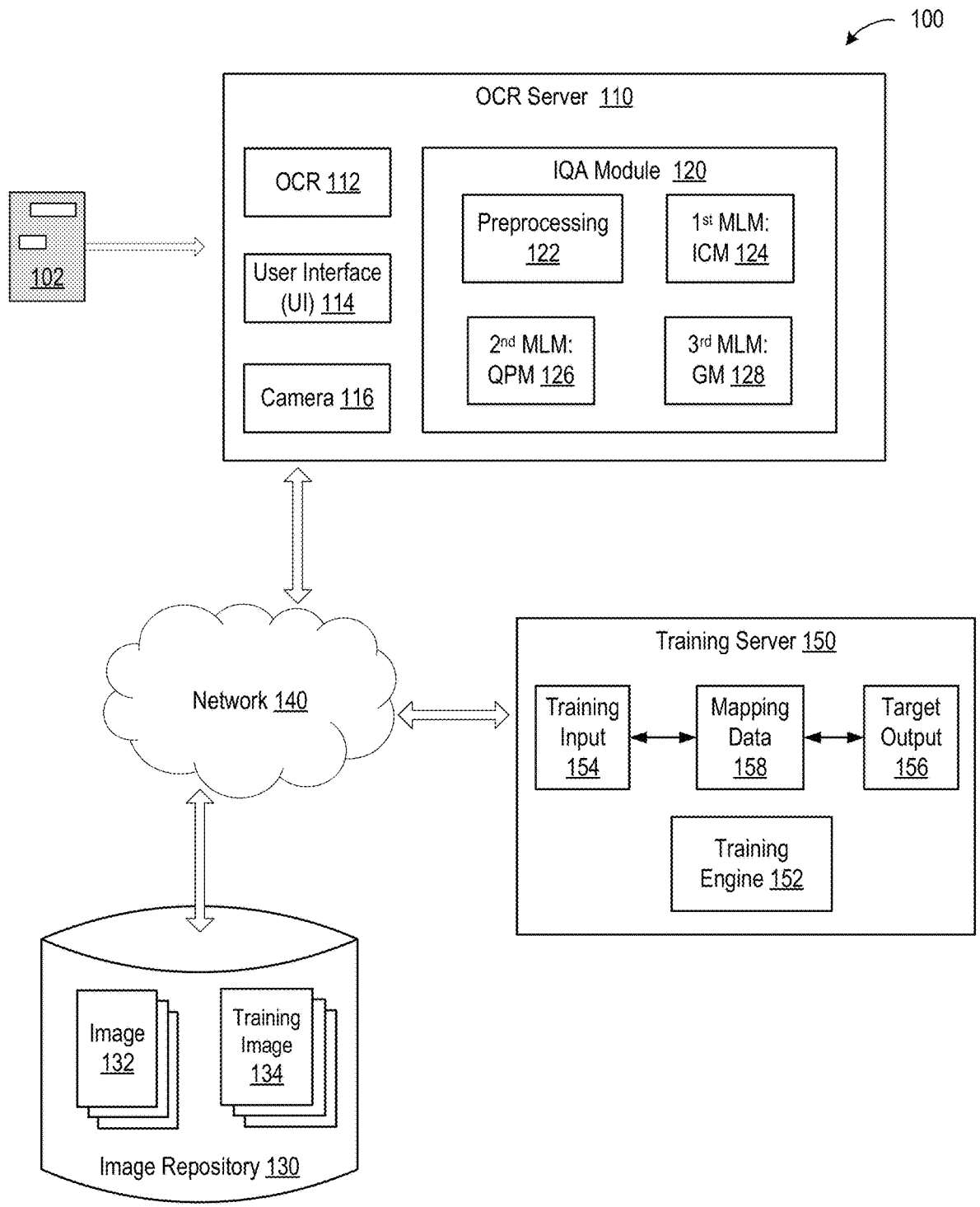
FIG. 1 is a block diagram of an example computer system in which implementations of the disclosure may operate.

Images that are used in optical character recognition (OCR) may include documents, indoor and outdoor scenery, moving objects, and the like. Images are often taken with cameras that have a limited resolution (e.g., cell phone cameras), cameras that are moving relative to the objects being imaged, cameras that are positioned far away from the objects, and so on. Resulting quality may, therefore, be insufficient for a successful OCR. Various characters and words can be missed or misrecognized and an incomplete or erroneous text can be extracted, as a consequence. Image imperfections can include blur (e.g., from a relative motion of the camera and an object(s) being imaged), defocusing, glare, noise, and the like. For example, defocusing can refer to formation of an image not within the imaging plane of the camera but in front or behind the imaging plane. Points of an image that is defocused (is out-of-focus) are imaged not on points within the image plane but on a spot that may extend over multiple pixels. Various points of the object are unresolved if the respective imaging spots overlap. Glare can refer to region(s) of an image having excessive brightness that reduces visibility of the underlying objects (e.g., text, logos, graphics). Excessive brightness can be caused by a direct light emitted by the objects (e.g., light from a bright billboard taken in a night setting) or by an indirect light reflected by the objects (e.g., light from sun or camera lighting device reflected by glossy or laminated pages of a document). As used herein, glare can also refer to region(s) of an image having insufficient brightness, e.g., from being at least partially shielded from sources of light. For example, a region near a crease of a book can include a text that is poorly discernable due to excessive darkness near the crease.

An image that has excessive blur, defocusing, and/or glare can be unfit for a reliable OCR. It is advantageous to make an accurate (and, preferably, quick) determination of a quality of the image based on assessment of imperfections contained in the image. Such an assessment saves computational resources and allows a user (or an automated system of image procurement) to know that the image is ought to be retaken, for better results. Using this knowledge, the user (or the automated system) can reacquire the image while a document (or other objects being imaged) is still available. For example, a driver exchanging insurance information with another driver after a traffic incident and taking a picture of the other driver's insurance policy would benefit from a quick determination of whether the image has an acceptable (for a subsequent OCR) quality.

Existing approaches to image quality assessment (IQA) include evaluation of the quality of images using a comparison with a reference image or without reference images. Full reference IQA (FR IQA) and partial reference IQA (PR IQA), which require at least some access to reference images, may be impractical in situations where numerous and/or unexpected types of images need to be digitized. On the other hand, methods that use no reference images (NR IQA) require development of sophisticated image evaluation techniques that are based on detailed characteristics of image imperfections. Such methods can be expensive to develop and difficult to implement on client devices having limited computational resources.

Aspects and implementations of the instant disclosure address the above noted and other deficiencies of the existing technology by providing efficient and computationally beneficial mechanisms for assessment of image quality and suitability of images for optical character recognition. The mechanisms described herein deploy machine-learning models (MLMs) that are trained to perform various functions of the IQA process. For example, a first MLM may be a model that determines characteristics of the image. A second model may use the determined characteristics of the image (output by the first MLM) to determine the image quality. For example, the first MLM may quantify image characteristics via numerical representations referred to as feature vectors herein. The feature vectors may be scale-dependent and may further belong to multiple types. More specifically, the first MLM may explore the image at difference scales, e.g., using 64×64 pixel patches of the image, 128×128 pixel patches of the images, and so on. For each scale, the first MLM may separately output feature vectors.

Feature vectors of a first ("quality") type may be representative of a blur, defocusing, glare, or any other image defect that is related to a reduction (compared with a sharp high quality image) of an image quality in a particular patch. Feature vectors of a second ("content") type may be representative of target entities in the image, such as a text; for example, one feature vector may be associated with a presence or absence of a text in the patch, another feature vector may be representative of a size of the text in the patch, and so on. Accordingly, while the feature vectors of the first type encode information about image quality in absolute terms, the second set of feature vectors provide a context for the image quality information. Accordingly, the feature vectors of the first type in conjunction with the feature vectors of the second type determine if the image quality is sufficient relative to the actual content of the image. For example, low quality of some of the patches of the image may be of lesser consequence if the text in those patches is absent or has a larger font size.

Since feature vectors (of both types) may be defined for patches of multiple scales, the feature vectors output by the first MLM can progressively track resolution of the image, from a larger scale (e.g., 512×512 pixels) to a lower scale (e.g., 64×64 pixels), or vice versa. Having feature vectors associated with multiple scales enables evaluation of the image quality for various text sizes. For example, feature vectors of a larger scale may be representative of the image's suitability for larger font recognition whereas feature vectors of smaller scale may encode information about suitability of the image for smaller font recognition.

A second MLM may extract image quality information from the feature vectors of both types (and obtained for multiple scales of the patches). The second MLM may predict quality of OCR based on these feature vectors. During operations of the second MLM, feature vectors may be processed (e.g., recomputed), the vectors of different types (and the same patches) may be joined together, and various joined vectors may then be recomputed as combinations of multiple joined vectors associated with different (e.g., neighboring) patches. Various methods of pooling may be used to extract a quality value predictive of the image's suitability for OCR.

In some implementations, glare can be represented via one of the feature vectors of the first type output by the first model. In other implementations, a dedicated third MLM trained to detect glare may be used. The third MLM may operate in parallel to the first MLM and may output a separate set of feature vectors. The feature vectors output by the third MLM may be combined (e.g., concatenated) with some of the feature vectors output by the first MLM (e.g., with the feature vectors of the first, "quality," type or with the joined vectors obtained after combining the feature vectors of the first type with the feature vectors of the second type). Processing by the second MLM may then continue as described above until a quality value or some other image assessment (e.g., in the form of various image quality maps) is obtained for the image.

The described implementations have multiple advantages over the existing technology. Firstly, the implementations provide for a faster and more accurate image assessment enabled by the use of two or more MLMs that are trained individually, as described in more detail below. The described MLMs can be trained on a training server using a general repository of training images (e.g., documents) or on an end user's device. In some implementations, the MLMs can undergo a combination training, e.g., an initial training on the training server administered by a developer and a supplemental training provided on the end user side. Secondly, the use of the feature vectors associated with patches of multiple scales enables the disclosed implementations to perform successful IQA of texts of different sizes. Selecting the number of scales of patches (e.g., one, two, fours, etc.) allows balancing speed with accuracy. In implementations deployed on systems having limited computational resources or when speed of assessment is essential, one or two scales of patches may be used. Conversely, when substantial resources are available or when accuracy is of more importance than speed, four or more scales of patches may be used.

FIG. 1 is a block diagram of an example computer system 100 in which implementations of the disclosure may operate. As illustrated, system 100 may include an OCR server 110, a image repository 130, and a training server 150 connected to a network 140. Network 140 may be a public network (e.g., the Internet), a private network (e.g., a local area network (LAN) or wide area network (WAN)), or any combination thereof.

The computer system 100 may be a desktop computer, a laptop computer, a smartphone, a tablet computer, a server, a scanner, or any suitable computing device capable of performing the techniques described herein. In some implementations, OCR server 110 may include one or more processing devices 1202 of FIG. 12.

An image 102 may be received by OCR server 110. Image 102 may be an image of any document, such as a commercial or government application, a contract, a research paper, a memorandum, a medical document, a government-issued identification, a newspaper article, a business card, a letter, or any other type of a document. Image 102 may be an image of any scenery (indoor and/or outdoor) that includes a text, e.g., names of stores, numbers of buildings, advertising billboards, and the like. In some implementations, a type of image 102 may be specified by a user (e.g., a user accessing OCR server 110, locally or remotely). In some implementations, a type of image 102 may be unknown. In some implementations, image 102 may be received as part of a set (stack) of multiple images. Image 102 may be received in any suitable manner. For example, OCR server 110 may receive a digital copy of image 102 after scanning or photographing a document. In some instances, a user may upload image 102 to OCR server 110 e.g., via network 140, from the user's local computer, from a remote computer accessible to the user, from a cloud storage service, and the like. In some implementations, text in image 102 is to be recognized (e.g., one it is determined that image 102 is of acceptable quality) using any suitable OCR techniques, which may be implemented by OCR 112.

In some implementation, OCR server 110 may include a user interface (UI) 114. UI 114 may allow a user to select and upload image 102, perform IQA and OCR on image 102, store image 102, store OCR results, and so on. UI 114 may be a graphics UI, a command-line UI, a menu-based UI, a voice-activated UI, or any other suitable UI or a combination of multiple types of UIs. UI 114 may be displayed on a screen of a desktop computer, a laptop computer, a tablet, a smartphone, a client device of a remote server, a touch-screen, a computer vision device, etc., or any combination thereof. User inputs may be entered via a pointing device (mouse, stylus, finger, etc.), a keyboard, a touchpad, a touchscreen, a microphone, an eye-movement monitoring device, an augmented reality device, etc., or any combination thereof.

OCR server 110 may include an image quality assessment module IQA module 120 to perform determination of image 102 suitability for OCR. In some implementations, IQA module 120 may include preprocessing 122 that may perform grayscaling, denoising, segmentation into patches, and the like, as described in more detail in conjunction with FIG. 2. OCR server 110 may further include trained machine learning models (MLMs) to perform IQA using the output of preprocessing 122. More specifically, IQA module 120 may include an image characterization model (ICM) 124, also referred herein to as a first MLM. The ICM 124 may generate feature vectors for image 102, as described in more detail below in conjunction with FIG. 3. IQA module 120 may further include a quality prediction model (QPM) 126, also referred to as a second MLM herein. The QPM 126 may process feature vectors generated by ICM 124 to generate an image quality assessment for image 102, as described in more detail below in conjunction with FIG. 4 and FIG. 5. In some implementations, IQA module 120 may further include a glare model (GM) 128, also referred to as a third MLM herein. The GM 128 may operate in parallel to the ICM 124 and output additional feature vectors that are input into QPM 126 together with the feature vectors generated by ICM 124, as described in more detail below in conjunction with FIG. 6.

Computer system 100 may include an image repository 130 storing multiple images 132 that may be processed by IQA module 120 and/or OCR 112. The image repository 130 may further store one or more training images 134 for training various MLMs, such as ICM 124, QPM 126, and/or GM 128.

Computer system 100 may include training server 150 to train models ICM 124, QPM 126, and/or GM 128 to determine image suitability for OCR 112. Training server 150 may include a training engine 152 to train the models using training data that includes training inputs 154 and corresponding target outputs 156 (correct matches for the respective training inputs). During training of models ICM 124, QPM 126, and/or GM 128, training engine 152 may find patterns in the training data that map each training input 154 to the target output 156. The training data may be stored in the repository 130 and may include one or more training images 134. Training data may also include mapping data 158 that maps training inputs 154 to the target outputs 156.

For example, the training engine 152 may select a number of training images 134 (e.g., images of documents). Training images 134, stored in image repository 130, may have a known blur, defocusing, glare, and the like. Training images 134 may be actual images having natural imperfections from camera motion, incorrect focus, poor lighting conditions, and the like. In some implementations, training images may be synthetic images, e.g., images obtained by adding imperfections to images 132. Training images 134 can range in the image quality from relatively low quality images (definitely unfit for OCR) to sufficiently high quality images (definitely fit for OCR), with multiple training images being somewhere within this continuum. Training images 134 may undergo OCR, which may be of the same type as OCR 112. Therefore, as part of the target output 156, it may be known to the training engine 152 whether OCR of a particular training image 134 has been successful or not.

In some implementations, mapping data 158 may include a binary value (e.g., Y or 1 for successful OCR and N or 0 for failed OCR). In some implementations, mapping data 158 may include a percentage (or some other representation) of the number of errors performed during OCR of the training image 134. In some implementations, OCR may be performed multiple times on the same image (e.g., using the same or different OCR software each or some of the times) and statistics of OCR results (e.g., a percentage of successful OCRs, an average number of symbols, words, sentences correctly/incorrectly recognized, etc.) may be collected. Based on the OCR results, a target quality value for the image may be assigned as part of the target output 156 for the image. Additionally, each or some of the image quality characteristics (blur, defocusing, glare, etc.) as well as each or some of the image content characteristic (presence/absence of text, text size, etc.) may be quantified and a respective intermediate value (or a set of values) may be assigned to each of the image characteristics. The ultimate target quality value for the image may be dependent on (or correlated with) these intermediate values. The intermediate values may be measured for various points in the image, including but not limited to the size and direction of the blur, the degree of defocusing, the degree of glare, the size of the text, and the like. The intermediate values may be used to train the first (ICM 124) and the third (GM 128) MLMs. Likewise, the target quality value(s) for the image may be used for training of the second (QPM 126) MLM.

During training of MLMs, training engine 152 may change parameters (e.g., weights and biases) of a respective model being trained until the model successfully learns how to correctly identify the target values, e.g., intermediate values for training ICM 124 or the quality value(s) for training of QPM 126. Additional training images may then be used. Trained models may subsequently be applied for determination of OCR fitness of new images (e.g., images 132 stored in image repository and/or images acquired by camera 116). Different models may be trained for different types of tasks. For example, one set of models may be trained for IQA that prioritizes speed of determination and another set of models that prioritizes accuracy over speed.

Each of the models trained as part of the IQA module 120 may include decision-tree algorithms, support vector machines (SVM), deep neural networks, and the like. Deep neural networks may include convolutional neural networks, recurrent neural networks (RNN) with one or more hidden layers, fully connected neural networks, long short term memory neural networks, Boltzmann machines, and so on.

The image repository 130 may be a persistent storage capable of storing images and documents. The image repository 130 may be hosted by one or more storage devices, such as main memory, magnetic or optical storage based disks, tapes or hard drives, network-attached storage devises, and so forth. Although depicted as separate from OCR server 110, in some implementations, the image repository 130 may be part of OCR server 110. In some implementations, image repository 130 may be a network-attached file server, while in other implementations, image repository 130 may be some other type of persistent storage such as an object-oriented database, a relational database, and so forth, that may be hosted by a server machine or one or more different machines accessible to the OCR server 110 via the network 140.

As used herein, "image" may be a scanned image, a photographed image, or any other representation of a document (or other collections of objects and/or symbols) that can be converted into a data form accessible to a computer. An image may conform to any suitable file format, such as PDF, DOC, ODT, JPEG, etc. An image may include a picture or some other representation of a document, such as a financial document, a legal document, a personal letter, a government form, a bill of lading, an archival or historical document, or any other document. An image may be of a document that is printed, typed, or handwritten. An image may represent a document that has a variety of fields, such as text fields (containing numerals, numbers, letters, words, sentences), graphics field (containing a logo or any other image), tables (having rows, columns, cells), and so on.

FIGS. 2A-2B illustrate an example preprocessing of an image for assessment of suitability of the image for OCR, in accordance with some implementations of the present disclosure. FIG. 2A is a block diagram of an example preprocessing 200 of an image that is used as input into a first MLM. Depicted schematically is an image 102 that may undergo (optional) grayscaling 210. Grayscaling 210 may use any suitable weighing scheme for RGB values (or values in any other color rendering space) of various pixels of image 102. Grayscaling 210 can be luminance-preserving. In implementations where OCR is performed directly on color images, grayscaling 210 may be skipped.

Grayscaled (if grayscaling is deployed) image 102 may be provided to a segmentation and resizing module 220 that segments image 102 into patches (smaller regions of image 102). Multiple scales of patches may be defined, e.g., 64×64 patches 230-1 (as measured in pixels), 128×128 patches 230-2, 256×256 patches 230-3, 512×512 patches 230-4, and the like. Any patches of a smaller or larger size may be used instead of (or in addition to) the above-referenced sizes. (Patches of some of the referenced sized may be absent.) Although square patches are referenced for simplicity, any other geometric shapes of patches may also be used, e.g., rectangular patches, polygon (triangular, hexagonal, etc.) patches, and so on. In some implementations, image 102 may be rescaled to fit into M×N patches. Rescaling may be performed to maintain (approximately) the aspect ratio of the image 102. For example, an image having pixel dimensions 1800×1200 may be rescaled to fit 4×3 patches of 512×512 size. Namely, the image can be rescaled along the long side to 1.14×1800=2052=4×512 pixels, and along the short side to 1.28×1200=1536=3×512 pixels. As a result, after rescaling, the image may be segmented into 12 patches of 512×512 size, 48 patches of 256×256 size, 192 patches of 128×128 size, and 768 patches of 64×64 size. In this example, the aspect ratio has changed by only 12 percent (1.28±1.14=1.12). In various implementations, rescaling can be performed up or down. For example, instead of rescaling up to fit 4×3 patches of 512×512 size, a 1800×1200 pixel image could have been rescaled down to 3×2 patches of 512×512 size. In some implementations, keeping the aspect ratio change to a minimum may be used as a selection criterion. In the current example, rescaling down to 3×2 patches would not change the aspect ratio, since $$\frac{1800}{3\times512} \div \frac{1200}{2\times512} = 1,$$

and could be preferable. In other implementations, rescaling may always be performed up (or may always be performed down).

Various patches 230-$x$ may have different sizes (e.g., patches 230-1 are smaller than patches 230-2) but may be processed by the same MLM, e.g., using a neural network having a certain number of input neurons. Accordingly, patches of various sizes may be resized to the same common size, e.g., 128×128 size, or 256×256 size, or any other pre-set common size. During resizing, intensity values for pixels of the resized patches may be interpolated from the intensity values of the original patches. For example, if the left edge of an initial patch is at $x_1$ and the right edge is at $x_2$ whereas the same edges of the resized patch are at $X_1$ and $X_2$, respectively, a linear mapping of various points $x \in [x_1,x_2]$ to points $X \in [X_1,X_2]$ may be performed as follows:

$$\frac{x - x_1}{x_2 - x_1} = \frac{X - X_1}{X_2 - X_1}.$$

The linear mapping x(X) described by this relation determines the intensity of pixels I(X) of the resized patch I(X)=i(x(X)), in terms of the intensity i(x) of pixels of the initial patches. Although the above example illustrates linear interpolation along one direction (e.g., when only one dimension of a patch is resized), a similar bilinear interpolation i(x,y)→I (X,Y)=i(x(X),y(Y)), may be performed with respect to both dimensions.

The above description references a two-step resizing, in which images are resized first (e.g., to fit the image to an integer number of largest-sized patches) and then the segmented patches are resized (normalized) to a common size. In some implementations, resizing may be performed in a single step. FIG. 2B illustrates a single-step resizing in which rectangular patches 222 of image 102 are resized directly into square patches 224 of a final size (e.g., 128×128 size), e.g., using a single bilinear (or some other) interpolation. Resized square patches 224 formed into stacks of patches (e.g., 230-3, as depicted) may then be used as an input into one or more MLMs, as described in more detail below.

Although not shown explicitly, it should be understood that the example preprocessing 200 may also include data augmentation, image denoising, amplification, binarization, and other operations with image 102.

Figure 3:
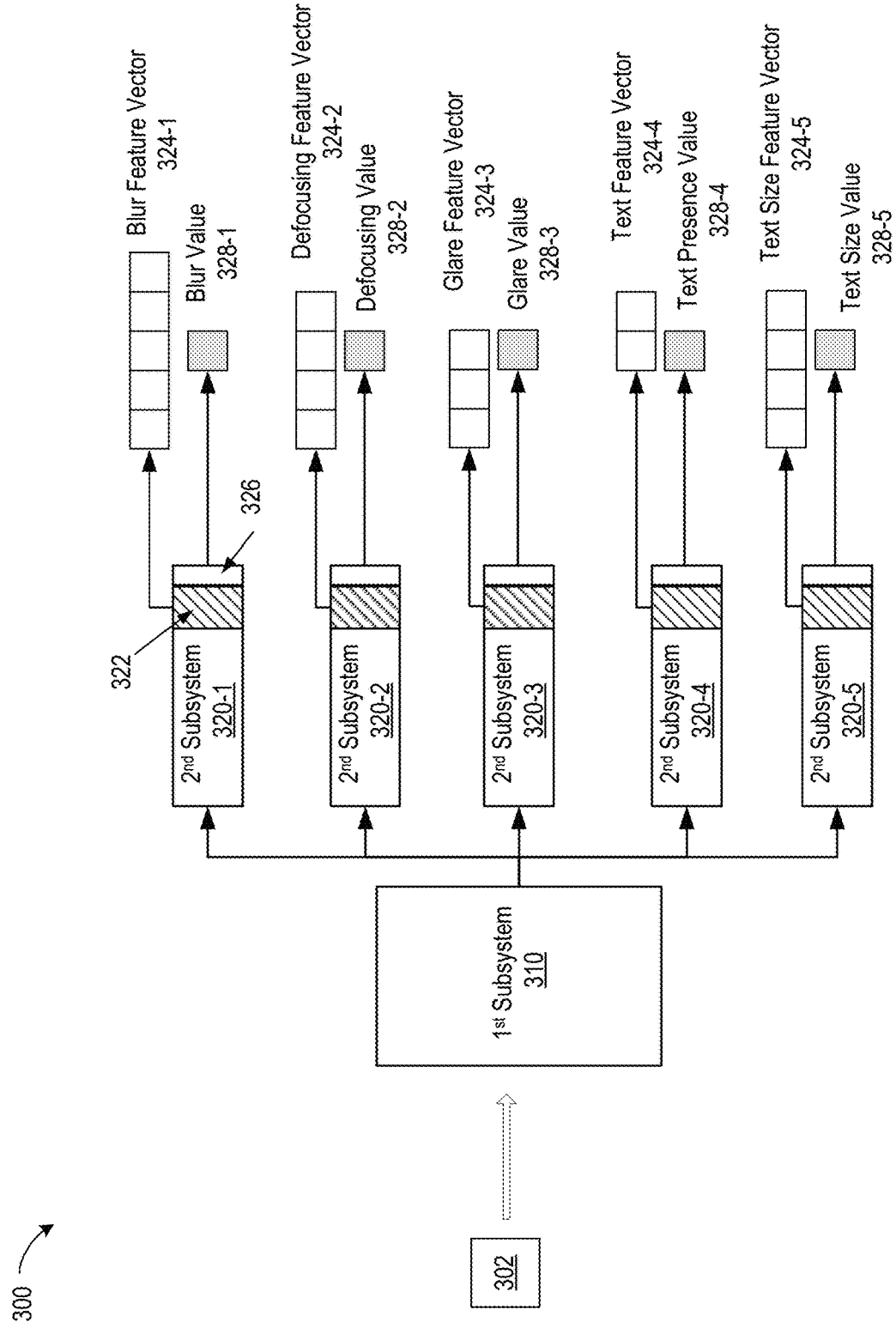
FIG. 3 is a block diagram of example operations of a first machine learning model that identifies image characteristics for assessment of suitability of an image for optical character recognition, in accordance with some implementations of the present disclosure.

FIG. 3 is a block diagram of example operations of a first machine learning model 300 that identifies image characteristics for assessment of suitability of an image for OCR, in accordance with some implementations of the present disclosure. The MLM 300 may be ICM 124 of FIG. 1. An input of the first MLM 300 may be a patch 302 of image 102 whose suitability for OCR is being assessed. Patch 302 may be any patch of the patches 230-$x$ depicted in FIG. 2. In particular, the first MLM 300 may process each of the patches 230-$x$ as described below. In some implementations, the first MLM 300 may be (or may include) a neural network having multiple neurons that are associated with learnable weights and biases. The neurons may be arranged in layers. As illustrated, the first MLM 300 may include a first subsystem 310 and a number of second subsystems 320-$x$. The subsystems 320-$x$ may be processing data in parallel to output respective feature vectors 324-$x$ and/or feature values 328-$x$. Each of the first subsystem 310 and second subsystems 320-$x$ may include multiple neuron layers.

In some implementations, the first subsystem 310 may include batch normalization to reduce statistical variance across input patches. The first subsystem 310 may include a number of convolutional layers to extract local and global context of the images contained in input patch 302. Convolutional layers may use any suitable parameters, including kernel/mask size, kernel/mask weights, sliding step size, and the like. In some implementations, masks can have dimensions of 3×3 pixels, 4×4 pixels, 5×5 pixels, or any other dimensions. Convolutional layers may alternate with padding layers and may be followed with one or more pooling layers, e.g., maximum pooling layers, average pooling layers, and the like.

The output of the first subsystem 310 may be input into a number of the second subsystems 320-$x$ configured to output feature vectors 324-$x$ and feature values 328-$x$. Each feature value may be representative of a particular characteristic of patch 302. For example, as depicted in FIG. 3, the second subsystems 320-1 through 320-3 may output feature vectors and feature values of the first ("quality") type, characterizing imaging quality of patch 302, while the second subsystems 320-4 and 320-5 may output feature vectors and feature values of the second ("content") type, characterizing content of patch 302. More specifically, output of the second subsystem 320-1 may be a blur feature vector 324-1 that characterizes the amount of motion blur in patch 302. Output of the second subsystem 320-2 may be a defocusing feature vector 324-2 that characterizes the amount of defocusing in patch 302. Output of the second subsystem 320-3 may be a glare feature vector 324-3 that characterizes the amount of glare in patch 302. Likewise, output of the second subsystem 320-4 may be a text feature vector 324-4 that characterizes the presence/absence of a text in patch 302 while output of the second subsystem 320-5 may be a text size feature vector 324-5 that characterizes the size of the text in patch 302.

Each of the second subsystems 320-$x$ may include normalization layers and one or more fully-connected layers. It should be understood that the architecture depicted in FIG. 3 is illustrative and that various alternative architectures of the first MLM may be possible. In some implementations, at least some of the fully connected neuron layers of the second subsystems 320-$x$ may replaced with convolutional layers. In one implementation, the second subsystems 320-$x$ do not have fully connected layers, so that the first MLM 300 is a fully convolutional network. Such a system architecture may be used where speed of assessment is more important compared with accuracy. For example, speed may be favored when a large number of images of relatively low importance (e.g., T-shirt labels) are being processed. On the other hand, processing of high-importance documents (e.g., passports or financial documents) may require higher accuracy but place less emphasis on speed (thus favoring networks with fully-connected layers).

A number of output feature vectors may similarly be varied. For example, for assessment of images of documents that are known to include a limited number of text sizes (e.g., images of a scanned book), the text size feature vector 324-5 may not be output. Similarly, for assessment of images of documents that are known to have no motion blur (e.g., images of stationary documents acquired by a desktop scanner), blur feature vectors 324-1 may not be output. In some implementations, as described in more detail below in conjunction with FIG. 6, the glare feature vector may be computed not by the first MLM, but by a separate MLM. In some implementations, additional feature vectors may be output that are not shown in FIG. 3. For example, in patches of images that have not been grayscaled, additional outputs may be included that characterize defects in representation of different colors (e.g., RGB).

The outputs of the second subsystems 320-x may further include feature values 328-x that describe a degree to which the respective quality attribute or content attribute is present in patch 302. For example, as depicted in FIG. 3, the second subsystems 320-1 through 320-3 may output blur value 328-1, defocusing value 328-2, and glare value 328-3, while the second subsystems 320-4 and 320-5 may output a text presence value 328-4 and a text size value 328-5. Defocusing value 328-2 may characterize the size (e.g., in pixels, millimeters, or any other units) of a spot in patch 302 that ideally (in a sharp image) would have been imaged by a single point (e.g., a single pixel). Text presence value 328-4 may be a binary value, e.g., 0 or 1, with value 0 indicating that no area of patch 302 is occupied with text (or that an area less than a threshold area is occupied with text). Text size value 328-5 may be a bucket value $T_j$ that may be one of $T_{min}, T_1, T_2, T_3, \ldots T_{max}$ with one or more bucket sizes (in pixels or other units, such as points) $T_1, T_2, T_3 \ldots$ identified (e.g., bucket value $T_2$ indicating text size between 10 pt and 12 pt). Additionally, cut-off values $T_{min}$ and $T_{max}$ may be identified such that the text size that is less than a minimum cut-off value $T_{min}$ or greater than a maximum cut-off value $T_{max}$ being treated as no text. The cut-off values $T_{min}$ and $T_{max}$ may be determined empirically by identifying the smallest and largest text sizes for which a reliable quality assessment of an image is still possible. In some implementations, a feature value may include multiple numbers. For example, blur value 328-1 may include three numbers: two semi-axes of a Gaussian ellipse that describes a motion blur and an angle that identifies the rotation of the ellipse relative to fixed reference axes (e.g., x-axis and or y-axis).

Feature vectors 324-x and feature values 328-x may serve different purposes. More specifically, feature vectors 324-x may be inputs into another processing stage (e.g., inputs into the second MLM, as described below). By nature, feature vectors 324-x represent internal perception, by the first MLM 300, of the respective quality and content characteristics of a respective patch. In contrast, feature vectors 324-x may be a human-readable digests of such internal perception and capable of being compared with measurable properties of the image (e.g., with the target data used in training). As depicted schematically, a feature value (e.g., blur value 328-1) may be output by the last layer of neurons, depicted by a white rectangle 326, of the respective second subsystem (e.g., second subsystem 320-1) whereas a feature vector (e.g., blur feature vector 324-1) may be an output of some previous (e.g., penultimate or some other) neuron layer 322, depicted as a shaded rectangle.

The human-readable feature values 328-x may be used in training of the first MLM 300 and may be compared with the target characteristics of patch 302. For example, the target characteristics may include a target blur value, a target defocusing value, a target glare value, target values representative of the presence and size of the text in patch 302, and so on. The parameters of the first MLM 300, including the first subsystem 310 and each of the second subsystems 320-x, may be adjusted in training, by backpropagating errors between the target values and the determined feature values through the neuron layers until the errors are minimized (or at least reduced).

In some implementations, the feature values 328-x may be used as a reduced input into a second MLM (e.g., QPM 126) trained for a quick estimation of the suitability of the image for OCR. In some implementations, the feature values 328-x are not directly input into the second MLM but are used in providing a user (developer) with a detailed patch-to-patch map of problematic areas within the image being assessed.

Figure 4:
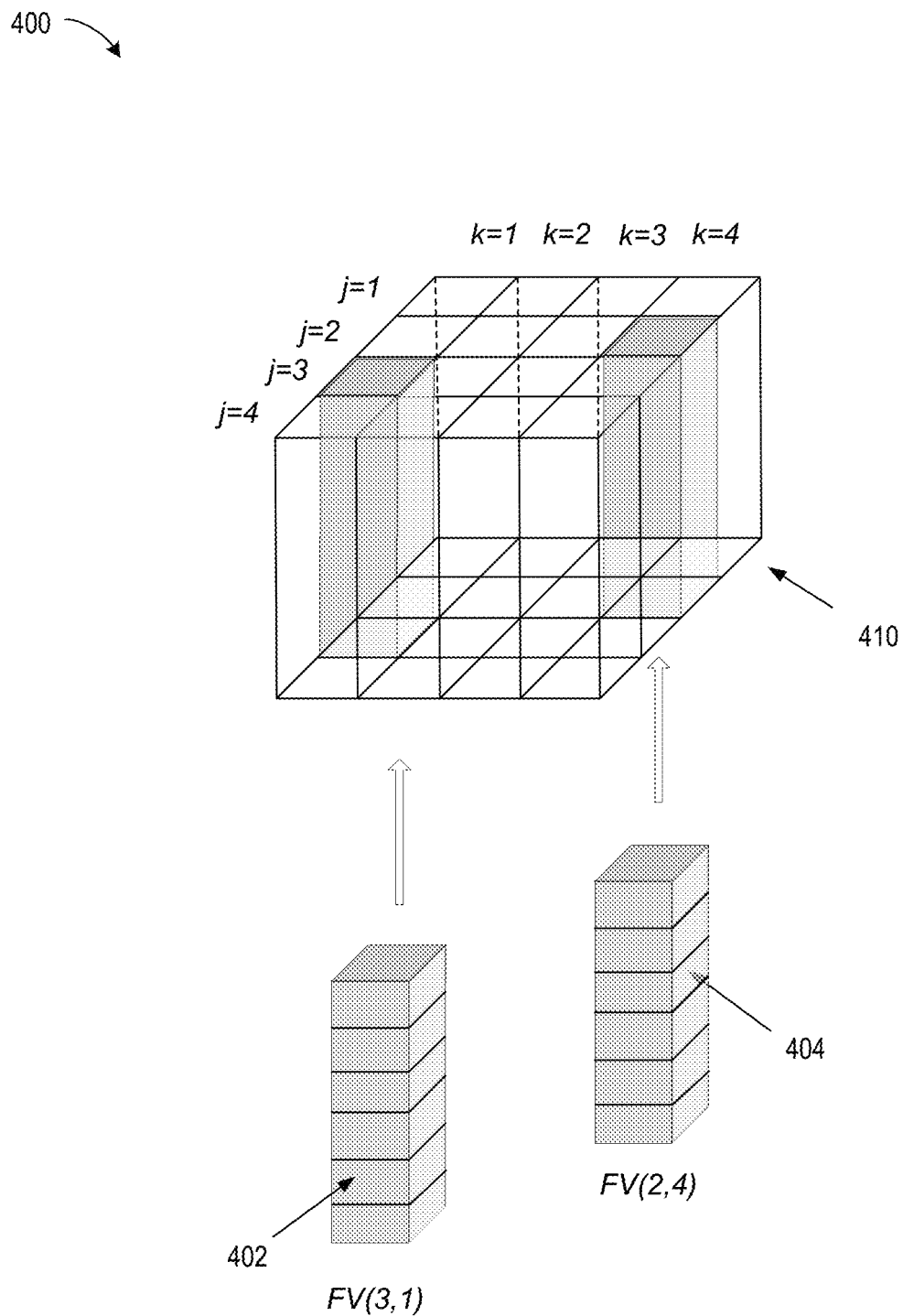
FIG. 4 illustrates formation of feature tensors using feature vectors output by a first machine learning model, in accordance with some implementations of the present disclosure.

The feature vectors corresponding to various patches 302, as output by the first MLM 300, may be input into a second MLM, which may be QPM 126 of FIG. 1. Feature vectors associated with patches of the same scale (e.g., all vectors associated with 256×256 patches) may be combined into feature tensors. FIG. 4 illustrates formation of feature tensors using feature vectors output by a first MLM, in accordance with some implementations of the present disclosure. As depicted, the output feature vectors may be associated with an image that is segmented into sixteen 256×256 patches. Each patch, enumerated with a row index j and a column index k is represented with a respective matrix element (j,k). For each feature vector described above in conjunction with FIG. 3 (e.g., a blur feature vector 324-1, a text size vector 324-5, and so on), a separate feature tensor 410 may be formed whose vertical columns are feature vectors FV(j,k) associated with patch (j,k). Depicted in FIG. 4 are feature vector FV(3,1) 402 and feature vector FV(2,4) 404. Although depicted for conciseness are six-component feature vectors 402 and 404 (as indicated by six vertical sections of each feature vector), in various implementations feature vectors FV(j,k) may have any number of components, as may be determined by a number of neurons in the neuron layer that outputs respective feature vectors (e.g., layer 322 in FIG. 3).

Figure 5:
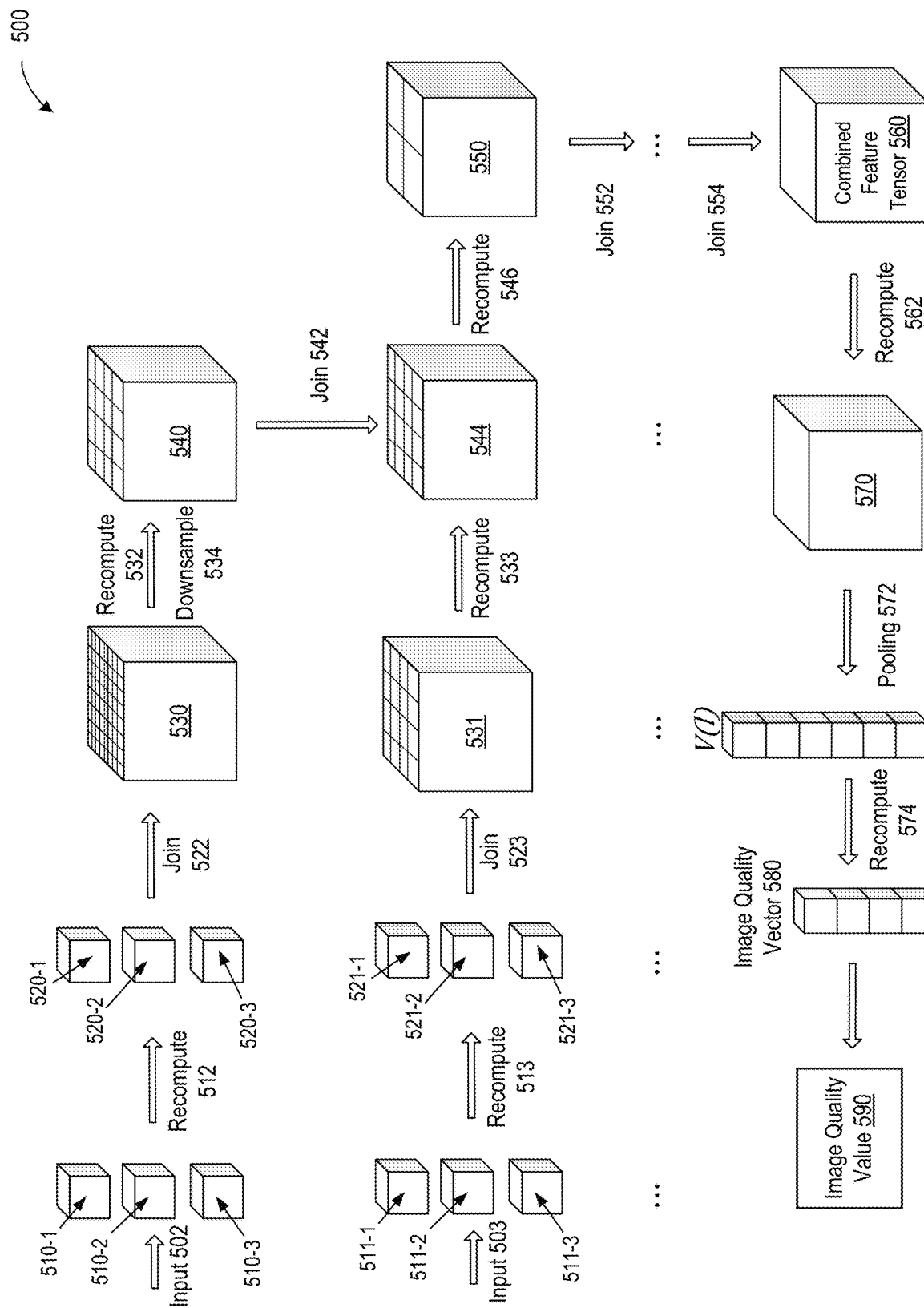
FIG. 5 is a block diagram of example operations of a second machine learning model that predicts quality of an image based on image characteristics output by the first machine learning model, in accordance with some implementations of the present disclosure.

FIG. 5 is a block diagram of example operations of a second machine learning model 500 that predicts quality of an image based on image characteristics output by the first machine learning model, in accordance with some implementations of the present disclosure. The second MLM 500 may be QPM 126 of FIG. 1. Feature tensors, formed as described with reference to FIG. 5, may be computed for each of K feature vectors (e.g., K=5 in the example in FIG. 3) and for each of L scales of patches (e.g., L=4 in the example in FIG. 2) for the total number of K×L different tensors that are input into the second MLM 500. As depicted in FIG. 5, input 502 into the second MLM 500 includes three feature tensors (K=3) 510-1, 510-2, and 510-3 that are associated with the smallest patches (e.g., 64×64 patches) of the image. Input 503 includes three feature tensors 511-1, 511-2, and 511-3 that are associated with the next smallest patches (e.g., 128×128 patches), and so on (other L−2 scales of patches are not shown for conciseness).

Each of the input feature tensors 510-x and 511-x (and others not shown) may then be processed by a recompute 512 stage using one or more neural layers, which may be convolutional layers applying convolutional masks and sliding windows to elements of the respective feature tensors. Masks and sliding windows used during recompute 512 stage may be three-dimensional and may apply (and slide) along both the horizontal dimensions of the tensors (e.g., spatial dimensions) as well as the vertical dimension (different components of each feature vector). In some implementations, recompute 512 stage may use at least one fully-connected layer. In some implementations, all operations of the recompute 512 stage may be fully-connected neuron operations. As a result of performing the recompute 512 stage, the dimensions of the feature tensors may be changed (e.g., reduced), although in some implementations the dimensions may be preserved. Recomputed feature tensors 520-x may then undergo a join 522 operation, e.g., individual feature tensor of each patch scale may be stacked (e.g., concatenated) on top of each other to obtain a joined feature tensor 530. (Although various tensors, e.g., 510, 520, 530, etc., are depicted in FIG. 5 as cubes for simplicity, it should be understood that dimensions along some or all three dimensions may be different.) The joined feature tensor 530 may undergo a further recompute 532, which may include additional three-dimensional convolution masking and sliding operations (with masks and sliding windows that may be different from masks and windows of the recompute 512 stage). The recomputed tensor may also undergo a downsample 534 operation to reduce the size of the tensor to the next scale dimension. For example, if horizontal dimensions of the joined feature tensor 540 are M×N, a downsampled feature tensor 540 may have spatial dimensions (M/2)×(N/2). Downsample 534 operation may be performed via various aggregation operations, such as maximum pooling, minimum pooling, average pooling, pooling that uses nonlinear operations, or the like.

Operations that are similar to operations recompute 512, recompute 532, and join 522 may similarly be performed based on input feature tensors 511-x for the patches of the next largest size (e.g., represented by feature tensors of (M/2)×(N/2) spatial dimensions). For example, a recompute 513 stage may be applied to tensors 511-x to obtain feature tensors 521-x that may also be subjected to join 523 operation. Another recompute 533 operation may then be applied to a joined feature tensor 531. The resulting feature tensor 544 may have spatial dimensions that are the same as the spatial dimensions of the downsampled tensor 540. A join 542 operation may be performed to join the feature tensors 540 and 544 and a recompute 546 operation may then be applied to obtain a feature tensor 550 representative of the quality and content of the patches of both scales (64×64 pixels and 128×128 pixels). After the join 542 operation (which may be a stacking operation), the vertical dimension (e.g., 2P) of the resulting feature tensor may be larger (e.g., twice larger) than the vertical dimensions (e.g., P) of each of the feature tensors 540 and 544. The recompute 546 operation may be used to bring the number of dimensions down (e.g., to P). The recompute 546 operation may include one or more (three-dimensional) convolutions and one or more pooling operations (e.g., for pooling along the vertical direction). In some implementations, one or more fully-connected neuron layers may be involved in the recompute 546 operation.

The obtained feature tensor 550 may subsequently be joined with a feature tensor for the next scale of patches (e.g., 256×256 pixel scale) that may be obtained from the respective input feature vectors similarly to how the feature tensor 544 is obtained. The process of aggregation and recomputation of patches of progressively increasing scales results (via a series of additional operations, such as additional join 552 and join 554 operations and other operations depicted with ellipses) in a combined feature tensor 560 that collects quality and content information about all patches. In some implementations, the combined feature tensor 560 may have as many vectors along the two spatial dimensions as there are patches of the largest size. In one non-limiting example, if there are M×N patches of the smallest size (64×64 pixels) and four scales of patches, the number of vectors in the combined feature tensor 560 may be (M/16)× (N/16). The combined feature tensor 560 may undergo an additional recompute 562 operation, e.g., using one or more convolutional and/or fully connected neuron layers, to generate a recomputed combined feature tensor 570. (In some implementations, the second MLM 500 may be a fully convolutional network.) A pooling 572 operation may then be performed on recomputed combined feature tensor 570 to generate an image quality vector 580 that is representative of a quality of the image for recognition of the specific content (e.g., text) of the image. In some implementations, the pooling 572 operation may include global average pooling. For example, the elements of the recomputed combined feature tensor 570, T(j,k,l), may be added across the spatial dimensions to obtain vector, V(l):

$$V(l) = C \cdot \sum_{j,k} T(j, k, l),$$

with some normalization constant C. In some implementations, the sum of squares (or any other powers) of the elements T(j,k,l) may be used. In other implementations, the mapping (pooling) T(j,k,l)→V(l) may be performed in some other way. For example, a geometric average (or any other function) of the individual tensor components may be used.

To the remaining components of vector V(l), an additional recompute 574 operation may optionally be applied to change (e.g., reduce) the number of vector components of vector V(l). The additional operation may include one or more fully connected layers with decreasing (in the direction of the flow of computations) number of neurons. The resulting image quality vector 580 may include information that characterizes a global quality of the image relative to the content of the image. For example, some components of image quality vector 580 may be representative of the average amount of imperfections (blur, glare, defocusing, etc.) in the image, as well as some additional statistical information (e.g., variance) of the distribution of these imperfections across some area of the image. In some implementations, the output of the second MLM 500 may further include an image quality value 590, which may be a combined value Q representative of the overall quality of the image. Values Q that are below a certain (e.g., empirically-determined) threshold ($Q<Q_T$) may indicate that the image is determined to be unfit for OCR. Conversely, values Q that are at or above the threshold ($Q \geq Q_T$) may indicate that the image quality is sufficient for OCR. In some implementations, image quality value 590 may represent a predicted probability of success of OCR, e.g., Q=0.75 may indicate that OCR has a chance of succeeding with the 75% probability. In some implementations, image quality value 590 may represent a predicted probability of correctly recognized characters for OCR, e.g., Q=0.9 may indicate that 90% of characters are likely to be correctly recognized during OCR. Image quality value 590 may be computed from various components of the image quality vector 580, with different components weighted based on a particular OCR algorithm. For example, if the OCR algorithm is less sensitive to defocusing but more sensitive to glare, glare imperfections may be weighed more heavily than defocusing imperfections in determining the image quality value 590.

In some implementations, to speed up image quality assessment, input into the second MLM 500 may include only some of the patches of image 102, which may be selected randomly or in some ordered geometric fashion (e.g., a checkered pattern). In one illustrative non-limiting example, an image 102 may be segmented into 6×4 patches of 512×512 pixel size. Patches (1,2), (2,6), (3,3), (4,5), . . . may be selected, with (j,k) denoting a patch in j-th row and k-th column. In some implementations, also selected may be patches of the next largest size (e.g., 256×256 pixel patches) that overlap with the largest patches, e.g., patches (1,3), (1,4), (2,3), and (2,4) that overlap with the (1,2) largest patch, patches (3,11), (3,12), (4,11), and (4,12) that overlap with the (2,6) largest patch, and so on. In some implementations, patches of different sizes may be selected in different (e.g., uncorrelated) locations.

Figure 6:
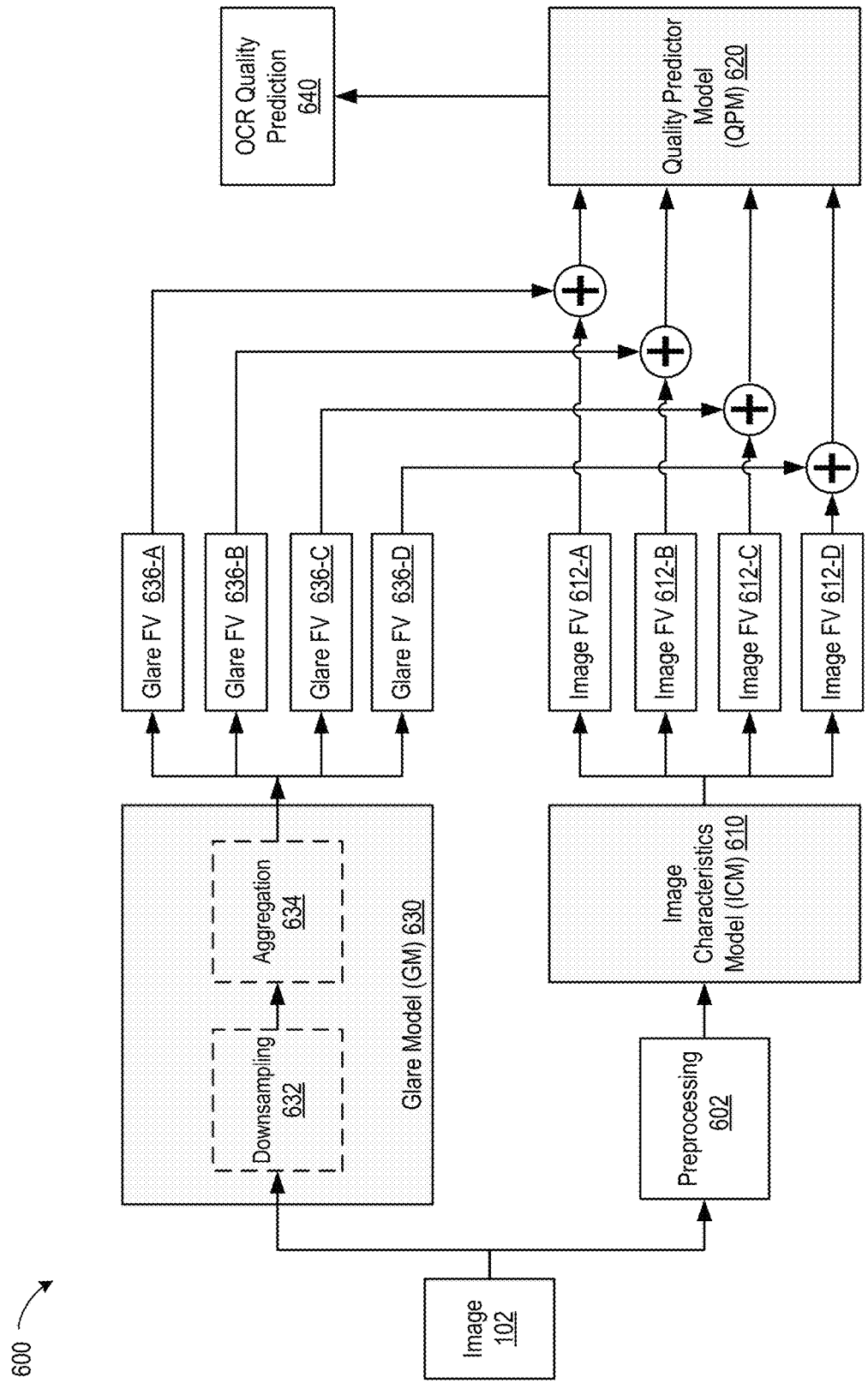
FIG. 6 is a block diagram of a system for quality assessment of images that uses multiple models, in accordance with some implementations of the present disclosure.

FIG. 6 is a block diagram of a system 600 for quality assessment of images that uses multiple models, in accordance with some implementations of the present disclosure. System 600 includes a first MLM, such as ICM 610, for determining image characteristics of image 102, and a second MLM, such as QPM 620, for assessing quality of image 102, based on image feature vectors (FVs) 612-A through 612-D. Additionally, system 600 includes a third MLM, such as a separate glare model (GM) 630, for efficient identification of image imperfections associated with excessive brightness (or, in some implementations, with excessive darkness) of various regions of image 102. The operations of the bottom portion of system 600, which includes ICM 610, may be similar to the operations described in conjunction with FIGS. 2-5. In implementations illustrated with FIG. 6, however, image feature vectors 612-x, output by ICM 610 and related to various characteristics of image 102 (e.g., blur, defocusing, presence of a text, size of the text, etc.), may exclude glare. Glare may be detected by the dedicated GM 630. For conciseness, all image vectors of different type associated with the same scale of the patches are depicted with the same box. For example, image feature vectors 612-A are to be understood as depicting all feature vectors (e.g. feature vectors characterizing blur, defocusing, presence of a text, size of the text, etc.) of a given scale (e.g., associated with patches having 64×64 pixels). Similarly, image feature vectors 612-B are to be understood as depicting all feature vectors of the next scale (e.g., associated with patches having 128×128 pixels); and so on. Although FIG. 6 has vectors of four different scales (A through D), any number of scales that is more or less than four may also be used.

Segmentation of image 102 into patches prior to inputting image 102 into ICM 610 may be performed by preprocessing 602, which may operate similarly to example preprocessing 200 described in conjunction with FIG. 2. Because, in many instances, glare in an image exists on a scale that is larger than a scale of a text character, segmentation of image 102 into patches may be skipped, as least in some implementations. Instead, a whole image 102 may be provided to GM 630.

GM 630 may use image 102 to generate a lower-resolution (than the resolution of image 102) map of superpixels of image 102, each superpixel representing a region of image 102 containing multiple pixels. The map of superpixels (referred to as a glare map herein) may indicate which pixels (if any) are obscured by glare and to what degree. In some implementations, the glare map may then be used to generate a set of glare feature vectors 636-x, characterizing a degree to which glare is present in patches of various scales. For example, glare feature vectors 636-A (generated based on the glare map) may represent presence of glare in various patches of the 64×64 pixel scale, glare feature vectors 612-B may represent presence of glare in various patches of the 128×128 pixel scale, and so on. Since glare feature vectors 636-x relate to the same patches as the respective image feature vectors 612-x, the two sets of feature vectors can be joined (e.g., concatenated). The respective concatenation operations are indicated with a plus symbol in a circle. For example, image feature vector 612-A may be joined with glare feature vector 636-A to form a joined feature vector for patches of 64×64 pixel size, image feature vector 612-B may be joined with glare feature vector 636-B to form a joined feature vector for patches of 128×128 pixel size, and so on. QPM 620 can then process the joined feature vectors, as described above in conjunction with FIG. 5. The output of QPM 620 may be an OCR quality prediction 640, which may include image quality assessment with respect to glare together with other image imperfections (blur, defocusing, text size being too small or too large, etc.). More specifically, with reference to with FIG. 5, image quality vector 580 may include additional components representative of the glare imperfections of image 102.

Architecture of GM 630 may include a downsampling stage 632 and an aggregation stage 634. The downsampling stage 632 may include one or more convolutional layers, each followed with one or more padding layers. In some implementations, convolutions may be performed using kernels (masks) having 3×3 pixel size (or 4×4 pixel size, or some other size). In some implementations, various convolutional layers of the downsampling stage 632 may have different numbers of kernels. In one non-limiting example, the first convolutional layer may have 8 kernels whereas the remaining convolutional layers may have 16 kernels. The downsampling stage 632 may reduce the size of image 102 from pixels to superpixels with each superpixel representing multiple pixels of image 102. For example, each superpixel may represent a region of image 102 of the size of 16×16 pixels, or 32×32 pixels, or any other size.

Aggregation stage 634 may include several upsampling convolutional layers, e.g., 4, 5, 6, or any other number of layers. In some implementations, convolutional layers may have 12, 24, or any other suitable number of kernels. Various activation functions maybe used, such as a rectified linear unit ReLU function, sigmoid function, softmax function, and so on. The upsampling layers may further include one or more fully connected layers. In some implementations, in addition to convolution layers, a normalization layer may be used to normalize brightness of various regions of the image. In some implementations, the architecture of GM 630 may include additional components not specified above. In some implementations, GM 630 may be a fully convolutional network.

Training of the first MLM (ICM 610), the second MLM (QPM 620), and (if deployed) the third MLM (GM 630) may be performed by the training engine 152 selecting training images (e.g., images of documents), which may be real images having one or more natural imperfections or synthetic (augmented) images with artificially added defects.

When augmented training images are being used, training engine 152 may obtain base images (e.g., natural images) to produce one or more augmented images. Training engine 152 may introduce various image defects (e.g., imperfections and/or distortions such as defocusing, blur, glare, etc.) into the base images. The image defects may include any defect that may be present in photographically acquired images, scanned images, printed images, and/or images obtained in any other manner. The augmented images may thus include simulated distortions with different parameters that represent realistic distortion types. In some implementations, training engine 152 may overlay one or more simulated defects over a base image. Examples of simulated defects may include one or more lines (e.g., vertical lines, horizontal lines, curved lines, or lines of any other suitable form and orientation), spots (circular spots, elliptical spots, etc.), and/or any other defects that may be present in an electronic document (e.g., a document to be processed using OCR techniques). In one implementation, one or more simulated defects (e.g., lines) may overlay over the base image that includes text. In another implementation, multiple types of simulated defects (e.g., lines and spots) may overlay over the base image. To overlay the simulated defect(s), training engine 152 may modify one or more portions of the base image(s) by identifying one or more pixels in the image corresponding to positional information of a simulated defect and changing the brightness of the identified pixels in accordance with the intensity (and/or color) information of the simulated defect.

In some implementations, training engine 152 may at least partially defocus the image, e.g., by applying Gaussian blur which may be selected within a pre-defined or adjustable range (e.g., 0.7-3.0, or some other range). In some implementations, training engine 152 may superimpose a motion blur on the image, thus simulating movement of the imaged objects (relative to the camera) within the exposure period determined by a shutter speed of the camera. In some implementations, training engine 152 may apply, to at least a subset of the image pixels, a simulated digital noise, such as Gaussian noise of a pre-defined or dynamically-adjustable amplitude. In some implementations, training engine 152 may simulate a glare by superimposing an additional light onto the image. In some implementations, training engine 152 may simulate a darkened (e.g., shaded) region of an image by reducing brightness of one or more clusters of pixels of the image. Additionally, training engine 152 may emulating gradient transitions (of a varying sharpness) between lighter and darker image regions. In some implementations, training engine 152 may simulate image pre-processing performed by the camera, e.g., by applying a sigma filter to at least a subset of the image pixels. In some implementations, training engine 152 may introduce noise, i.e., random variations of brightness or color. In some implementations, one or more of the above-referenced image processing operations may be combined. In some implementations, prior to adding any of the above-referenced image imperfections, training engine 152 may add a synthetic text of various sizes to the base image. As a result of such operations, each of the base images may be used to generate multiple training images that are different from each other by a degree of blur, noise, defocusing, glare, etc. The produced set of training images may be used to train one or more MLMs described in the instant disclosure.

Figure 7A:
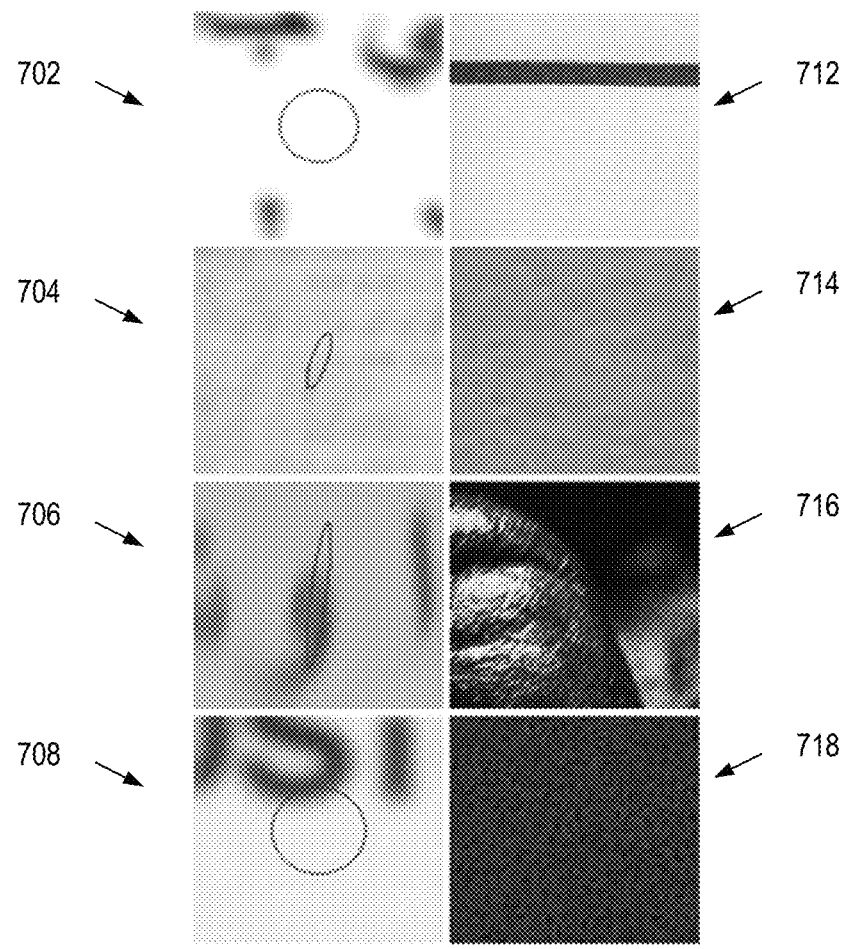
FIG. 7A illustrates example fragments of images that may be used to train one or more machine learning models, in accordance with some implementations of the present disclosure.
Figure 7B:
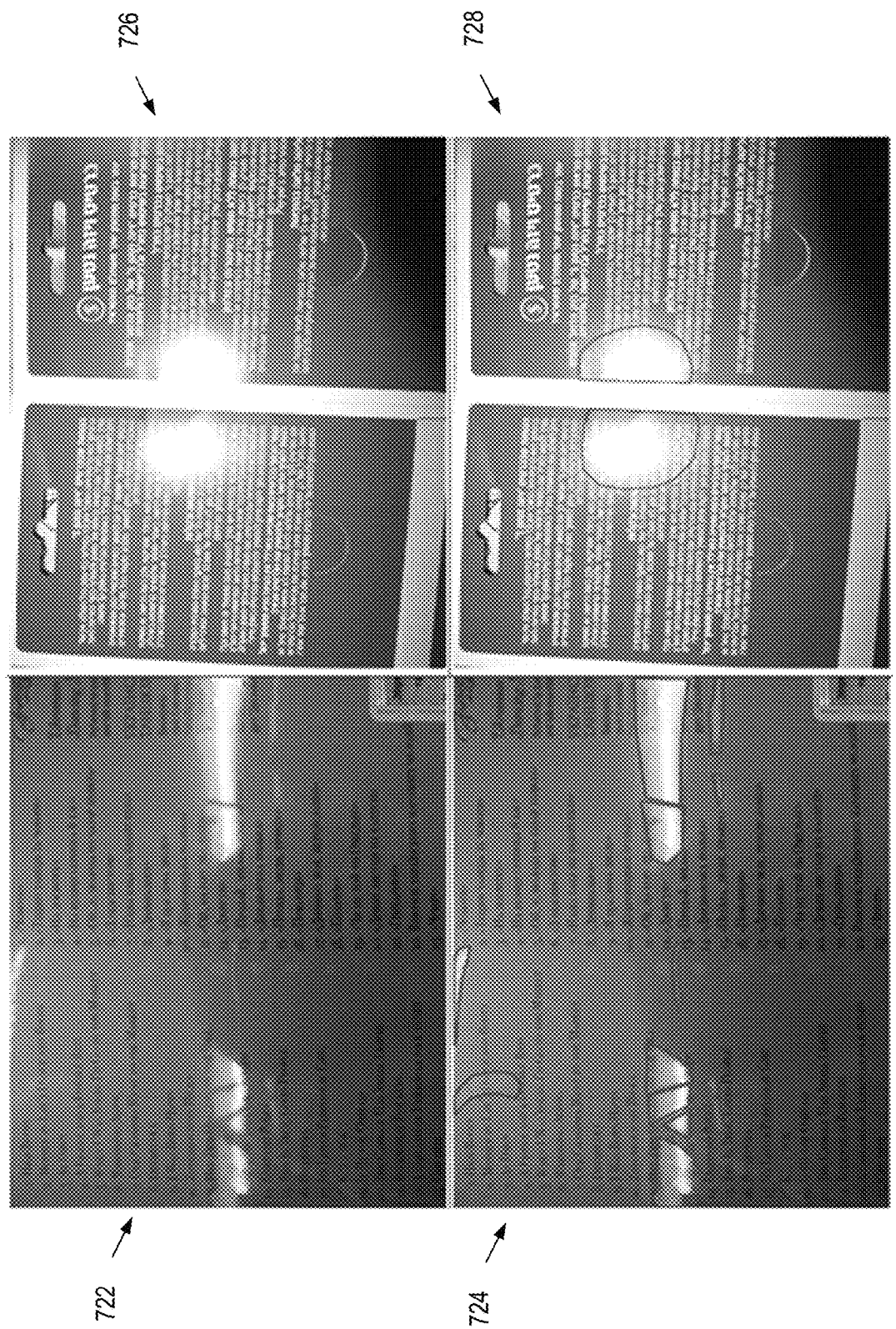
FIG. 7B illustrates example images that may be used to train one or more machine learning models to identify glare, in accordance with some implementations of the present disclosure.

Training images may have a known (e.g., measured or controlled by synthesis) blur, defocusing, glare, noise, and other imperfections. FIG. 7A illustrates example fragments of images that may be used to train one or more machine learning models, in accordance with some implementations of the present disclosure. Fragments 702 and 708 are (expanded) image fragments of a text with isotropic defocusing (as indicated with circles). Fragments 704 and 706 are (expanded) fragments of a text with anisotropic blur (as indicated with Gaussian ellipses). Fragments 712, 714, 716, and 718 are examples of non-textual image fragments. FIG. 7B illustrates example images that may be used to train one or more machine learning models to identify glare, in accordance with some implementations of the present disclosure. Images 722 and 726 are unannotated images containing glare. Images 724 and 728 are respective images having locations of the glare regions annotated (marked). The annotated regions may be used as ground truth in training the third MLM.

Training of the first MLM, e.g., ICM 610 in FIG. 6 and/or first MLM 300 of FIG. 3, may be performed using feature values (e.g., feature values 328-$x$ in FIG. 3) that represent one of the outputs of the first MLM (e.g., outputs of the last neuron layer of the first MLM). The output feature values may be compared with target characteristics of the training image. The target characteristics may describe a degree of defocusing in the training image and an amount of a blur in the training image, The amount of blur may be described by a degree of blur along principal axes of a Gaussian ellipse and an orientation of the principal axes (e.g., relative to fixed reference axes or the edges of the image). In those implementations where the first MLM also determines a degree of blur (or shading), the output feature values may further identify regions that have excessive lighting (or shading). The output feature values may further characterize presence or absence of a text in the training image and the size of the identified text (for various locations of the image). The difference between the feature values output during training and known target values can be measured (or otherwise determined) and used to adjust various parameters of the first MLM in the direction of decreasing the measured difference.

Training of the second MLM, e.g., QPM 620 in FIG. 6 and/or second MLM 500 of FIG. 5, which predicts image fitness for OCR, may be performed using an image quality vector (e.g., image quality vector 580) and an image quality value (e.g., image quality value 590) output by the second MLM. Various components of the image quality vector may represent an aggregate (e.g., average) amount of imperfections (blur, glare, defocusing, etc.) in the images and may contain additional statistical information (e.g., standard deviation) of the distribution of such imperfections across the image. The image quality value 590 may represent the overall quality of the image, including, but not limited to, a predicted probability of OCR success, a predicted percentage of characters correctly recognized by the OCR, and so on. The target image quality vector and the target image quality value may be known from the training image data (e.g., based on statistical analysis of imperfections and text in the image). Accordingly, the difference between the image quality vector/value obtained by the second MLM and the respective target image quality vector/value can be determined and used to adjust various parameters of the second MLM in the direction of decreasing the determined difference.

Training of the third MLM, e.g., GM 630 in FIG. 6, which identifies the glare (and shading) map within an image may be performed by comparing the respective map (e.g., as identified by glare feature vectors 636-$x$) with the known (or determined) glare map in a training image. The parameters of the third MLM may then be changed in the direction that ensures maximizing correct identification of glare (and shading) regions in the training image.

Figure 8:
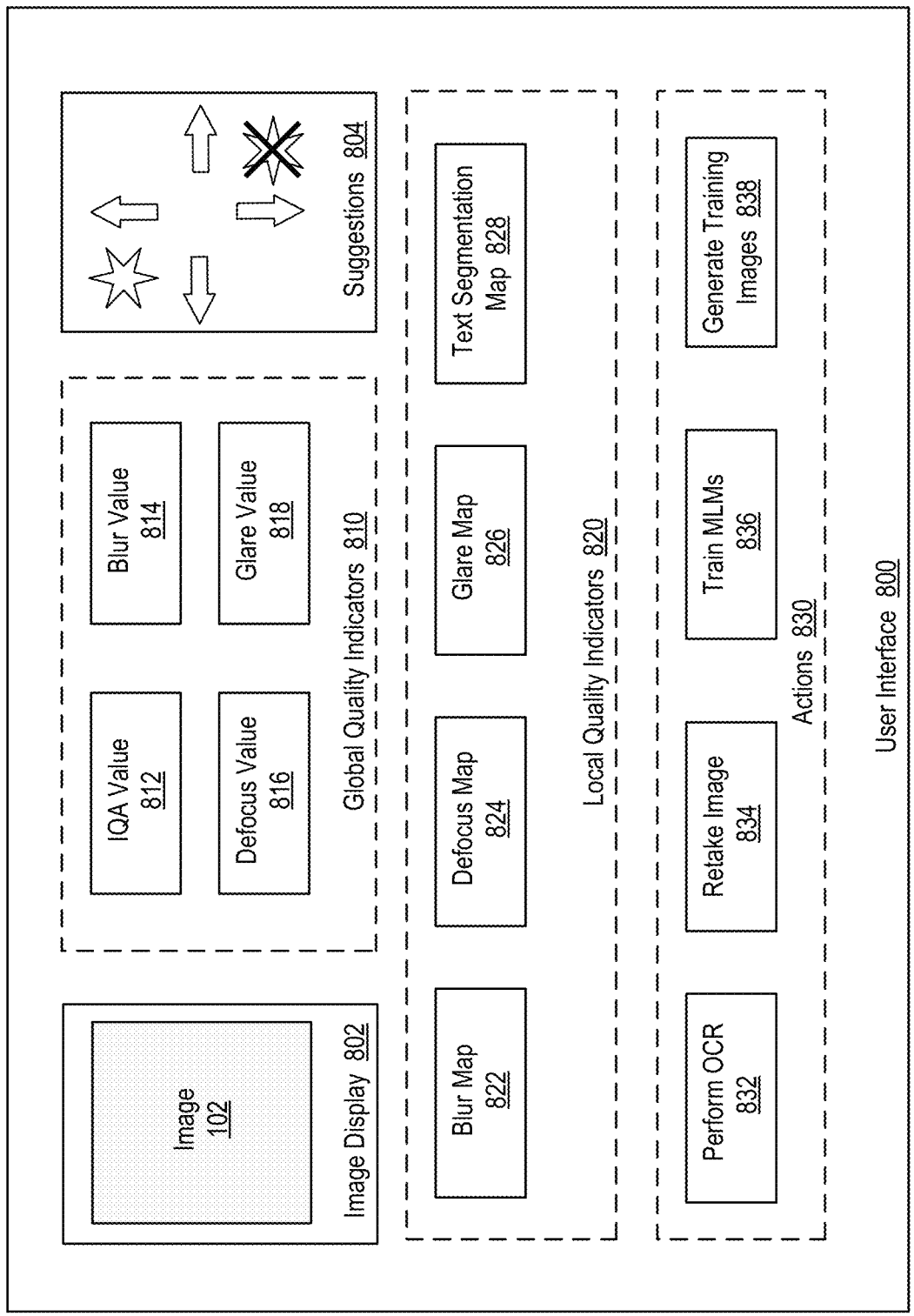
FIG. 8 illustrates an example user interface of an application that performs an assessment of images for suitability for optical character recognition, in accordance with some implementations of the present disclosure.

FIG. 8 illustrates an example user interface (UI) 800 of an application that performs an assessment of images for suitability for optical character recognition, in accordance with some implementations of the present disclosure. UI 800 may be provided on a user's desktop computer, laptop computer, tablet computer, a wearable device (e.g., smartphone or smartwatch), or any other computing device. In some implementations, the computing device that displays UI 800 may include one or more cameras (e.g., camera 116 in FIG. 1). The application providing UI 800 may be an application operating in conjunction with OCR server (e.g., OCR server 110) operating on the common with the OCR server computing device or an application that uses a remote connection with the OCR server. Even though implementations described in conjunction with FIGS. 1-7 may operate in a fully-automated mode, e.g., with IQA module 120 making a decision whether to proceed with processing image 102 using OCR 112 or retake the image with camera 116, an OCR server may provide a certain amount of control over the process to a user, via UI 800. UI 800 may be UI 114 depicted in FIG. 1 or a copy of UI 114 provided remotely.

UI 800 may include an image display 802 that displays an image (e.g., image 102) acquired by camera 116, retrieved from image repository 130, or obtained from any other source. In some implementations, image display 802 may be resizable and may display image 102 with a varying (e.g., user-controlled) degree of screen resolution. Global quality indicators 810 may include IQA value 812 which may indicate the overall fitness of image 102 for OCR, including a probability of success, a number of errors that is likely to occur, such as a percentage or the total amount of text characters or multi-character units (words, phrases) that are likely to be misrecognized. Global quality indicators 810 may further include values that provide more detailed assessment of the image 102, such as a blur value that characterizes a degree of motion blur in image 102, including direction and extent of blur. Global quality indicators 810 may further include a defocus value 816 that characterizes a degree of defocus in image 102 (e.g., average value of defocus over the image) and a glare value 818 that characterizes a degree to which image 102, as a whole, suffers from glare. In some implementations, excessively bright regions of image 102 and excessively dark regions of image 102 may contribute similarly to the glare value 818 (e.g., both reducing the glare value 818). Some or all global quality indicators 810 may be derived from image quality vector 580 and/or image quality value 590 (depicted in FIG. 5) as may be output by the second MLM (e.g., QPM 126, QPM 620).

In some implementations, user may benefit from a more detailed information regarding where deficiencies and imperfections are located in image 102. Accordingly, UI 800 may further include various local quality indicators 820. For example, by selecting a blur map 822, the user may prompt IQA module 120 to display (e.g., in a form of a heat map or any other graphical or numerical representation) a distribution of blur in image 102. Similarly, by selecting a defocus map 824, the user may prompt IQA module 120 to display a distribution of defocus in image 102. By selecting a glare map 826, the user may prompt IQA module 120 to display a distribution of glare (or shading) in image 102. By selecting a text segmentation map 828, the user may prompt IQA module 120 to display a distribution of regions (patches) of image 102 where text is present. The text segmentation map 828 may further indicate a size of the text in various regions of image 108. The text segmentation map 828 may be based on text feature vectors 324-4 and text presence value 328-4, as well as text size feature vectors 324-5 and text size value 328-5. Any of the selected maps may be displayed as overlays over image 102 in image display 802, with more than one map concurrently displayed, if desired. Any of the selected maps may display a local assessment (e.g., acceptable/not-acceptable) of various regions of image 102. Alternatively (or in addition), local assessment may include a probability that a specific defect type (e.g., local defocusing or glare) is to result in a local failure of OCR. Some or all local quality indicators 820 may be derived from feature vectors 324-x and/or feature values 328-x (depicted in FIG. 3) output by the first MLM (e.g., QPM 126). In some implementations, glare map 826 may be derived from glare feature values 636 (depicted in FIG. 6) output by the third MLM (e.g., GM 128, GM 630).

The information provided by global quality indicators 810 and/or local quality indicators 820 may cause the user to undertake one or more actions 830. If the user determines that the quality of image 102 is satisfactory, the user may select "perform OCR" 832 action and image 102 may be provided to an OCR server (e.g., locally or via a network connection) for the actual OCR. If the user determines that the quality of image 102 is not satisfactory, the user may select "retake image" 834 action and a camera accessible on (or via) the user's computer can acquire one or more additional images of the same documents or objects. In some implementations, the user may be further informed by suggestions 804 interface how the imaging conditions should be changed for improvement in the imaging results. Suggested changes may include repositioning the camera (or the document or objects being imaged), e.g., moving the camera laterally, bringing the camera closer to the document (or moving the camera away from the document), adding a source of light, removing a source of light, or repositioning the source of light relative to the document/objects, steadying the camera, setting a different shutter speed, diaphragm, filters, and so on.

In some implementations, the user may provide no input and an action (perform OCR or retake image) may be performed automatically. For example, if the IQA value 812 is above a certain threshold (e.g., 0.9 out of 1.0), image 102 may be sent for OCR processing. Alternatively, a certain weighed combination of blur value 814, defocus value 816, glare value 818, and further based on text/text size map 828, may be used for a threshold determination concerning whether the OCR should be performed or whether a new image should be acquired. In some implementations, weighing may involve all or some of blur map 822, defocus map 824, glare map 826, and text/text size map 828.

Actions 830 may further include additional functions, such as "train MLMs" 836 and "generate training images" 838. For example, having encountered an image in relation to which IQA module 120 fails to make a correct prediction, the user may decide to use this image for further training of the MLMs. For example, the image may be of a sufficient (for OCR) quality, but IQA module 120 may erroneously assess it as unsatisfactory. Conversely, the image may be of a poor quality, but may be misrecognized as a suitable image for OCR. In such instances, the user may initiate additional training of the MLMs using such a problematic image. In some implementations, the user may additionally augment the problematic image with extra blur/defocusing/glare/etc., to generate multiple images for better training.

Figure 9:
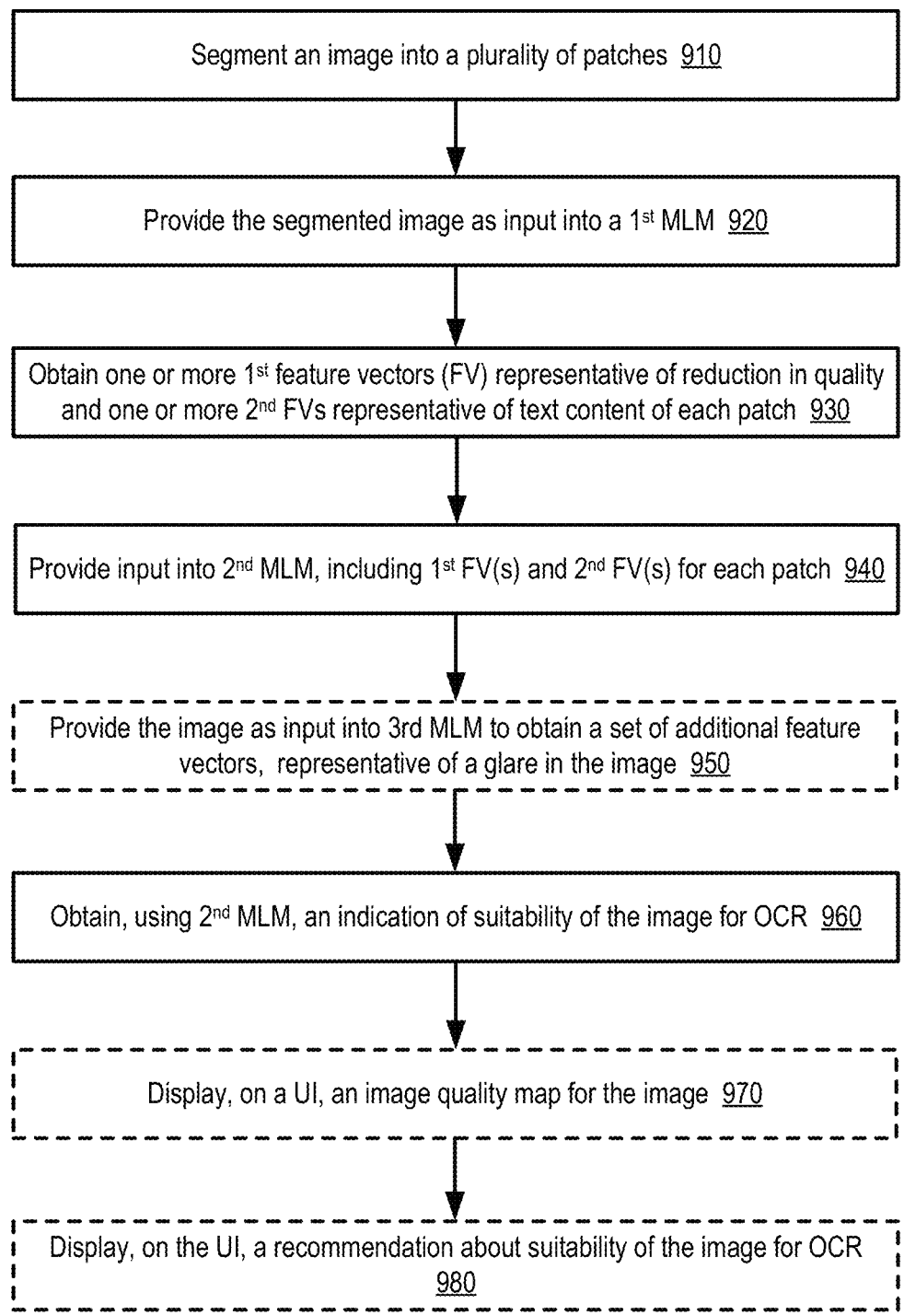
FIG. 9 is flow diagram illustrating one example method of using multiple trained machine learning models to determine suitability of an image for optical character recognition, in accordance with some implementations of the present disclosure.
Figure 10:
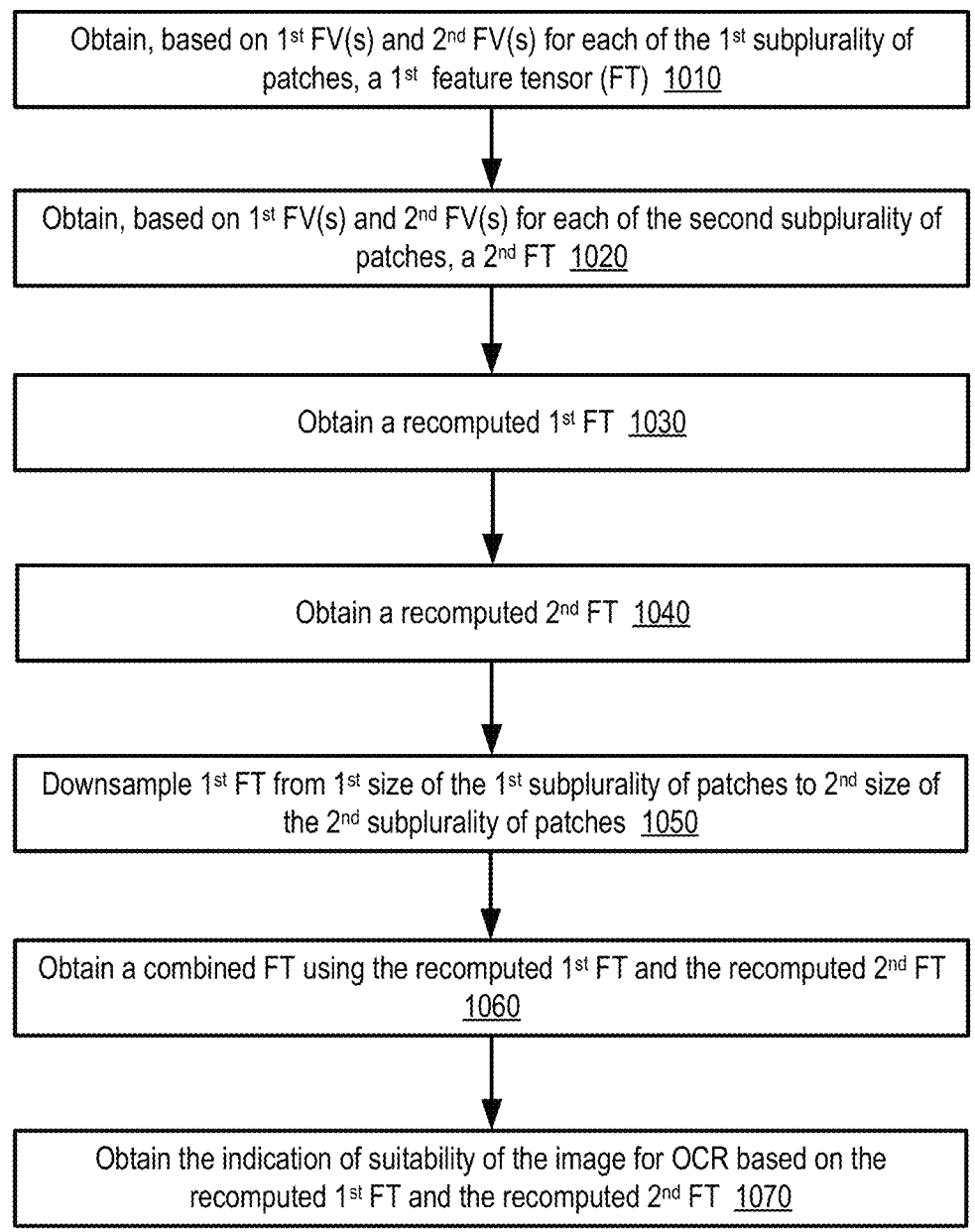
FIG. 10 is flow diagram illustrating one example method of operations of an image quality prediction machine learning model, in accordance with some implementations of the present disclosure.
Figure 11:
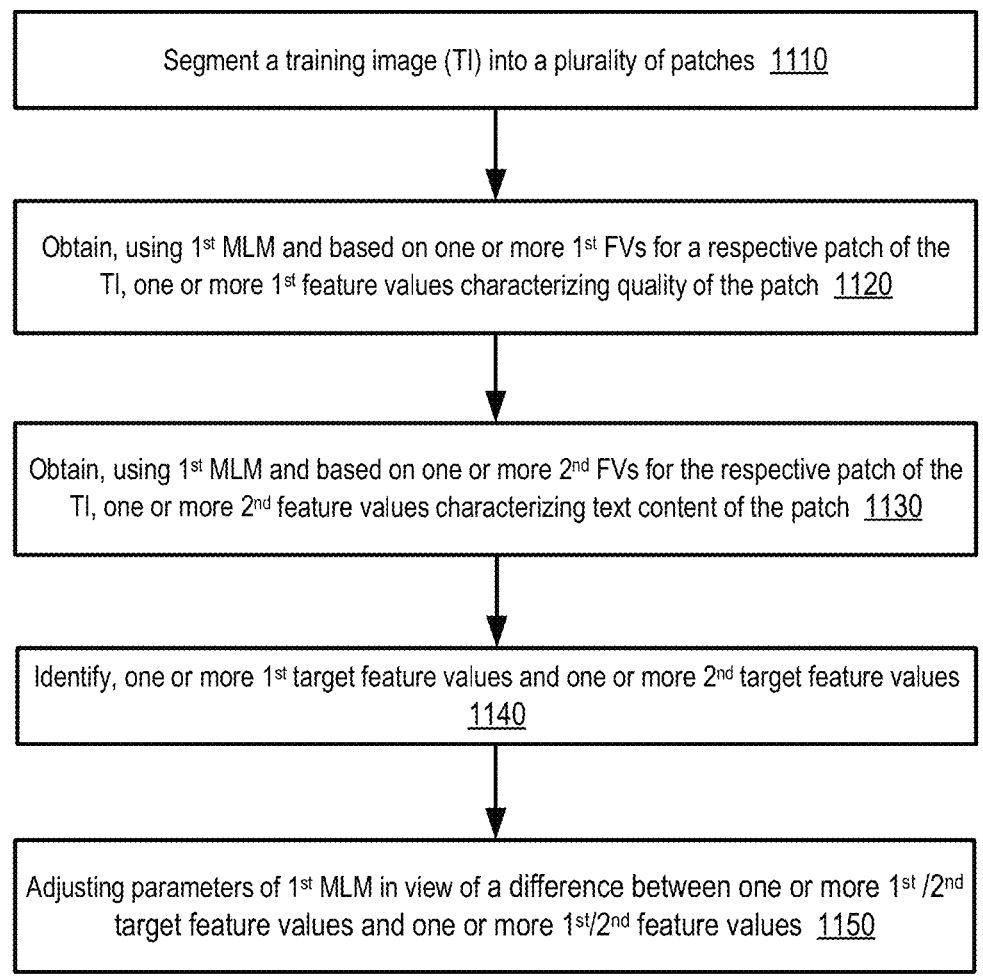
FIG. 11 is flow diagram illustrating one example method of training of an image quality prediction machine learning model, in accordance with some implementations of the present disclosure.

FIGS. 9, 10, and 11 are flow diagrams illustrating example methods 900, 1000, and 1100 that use machine learning models for efficient and accurate assessment of image quality, in accordance with some implementations of the present disclosure. Each of methods 900, 1000, and 1100 may be performed by processing logic that includes hardware (e.g., circuitry, dedicated logic, programmable logic, microcode, etc.), software (such as instructions run on a processing device), firmware, or a combination thereof. In one implementation, methods 900, 1000, and 1100 may be performed by a processing device of OCR server 110 and/or training server 150, as described in connection with FIG. 1. In certain implementations, methods 900, 1000, and 1100 may be performed by a single processing thread. Alternatively, methods 900, 1000, and 1100 may be performed by two or more processing threads, each thread executing one or more individual functions, routines, subroutines, or operations of the method. In an illustrative example, the processing threads implementing methods 900, 1000, and 1100 may be synchronized (e.g., using semaphores, critical sections, and/or other thread synchronization mechanisms). Alternatively, the processing threads implementing methods 900, 1000, and 1100 may be executed asynchronously with respect to each other. Therefore, while FIGS. 9, 10, and 11 and the associated descriptions list the operations of methods 900, 1000, and 1100 in certain order, various implementations of the methods may perform at least some of the described operations in parallel and/or in arbitrary selected orders.

FIG. 9 is flow diagram illustrating one example method 900 of using multiple trained machine learning models to determine suitability of an image for optical character recognition, in accordance with some implementations of the present disclosure. At block 910, a computing device (e.g., a computer having one or more processors communicatively coupled to one or more memory devices) implementing method 900 may segment an image into a plurality of patches. The image may be taken using one or more cameras associated with the computing device performing method 900, right before the image is segmented into patches or at any time in the past. In some instances, the previously taken image may have been stored locally (on the computing device), on a cloud, or in any image repository accessible to the computing device. In some implementations, the plurality of patches may include patches of different size, as described above in connection with FIG. 3. For example, the plurality of patches may include a first subplurality of patches of a first size and a second subplurality of patches of a second size that is different from the first size. For example, the first size of patches may be one of 64×64 pixels, 128×128 pixels, 256×256 pixels, or any other size (including patches of rectangular and non-rectangular sizes). The second size of patches may be one of 128×128 pixels, 256×256 pixels, 512×512 pixels, or any other size. In some implementations, there may be a third (fourth, etc.) subplurality of patches of a third (fourth, etc.) size that is different from the first, second (third, etc.) size. The first subplurality of patches, the second (as well as the third, etc.) subplurality of patches may cover the same common portion of the image, e.g., the whole image or at least a portion of the image where a text is likely to be located.

At block 920, method 900 may continue with the processing device providing the segmented image as an input (herein referred to as a first input) into a first machine learning model (MLM). The first MLM may be the image characterization model (ICM) 124 or ICM 610. In some implementations, the first MLM may operate as described in connection with FIG. 3. At block 930, the processing device performing method 900 may obtain, using the first MLM, for each patch of the plurality of patches, a number of feature vectors. The feature vectors may include one or more first feature vectors representative of a reduction of imaging quality in a respective patch. The one or more first feature vectors may be representative of at least one of a blur, a defocusing, or a glare in the respective patch. The feature vectors may further include one or more second feature vectors representative of a text content of the respective patch. For example, the one or more second feature vectors may be representative of at least one of a presence of a text within the respective patch or a size of the text within the respective patch. In some implementations, the feature vectors generated by the first MLM may include multiple first feature vectors representative of imaging quality reduction (e.g., both the blur feature vector and the defocusing feature vector) and multiple feature vectors representative of a text content (e.g., both the text presence feature vector and the text size feature vector).

At block 940, the computing device performing method 900 may provide an input (herein referred to as a second input) into a second MLM. The second input may include at least some outputs of the first MLM. More specifically, the second input may include, for each patch of the plurality of patches (including subpluralities of patches of different sizes), the one or more first feature vectors and the one or more second feature vectors (more than two feature vectors may be output by the first MLM, as described above in conjunction with block 930). Any or both of the first MLM and the second MLM may include a neural network model having a plurality of layers of neurons. Any or both of the first MLM and the second MLM may include one or more convolutional layers of neurons and one or more fully connected layers of neurons. For example, first subsystem 310 of neurons of the first MLM depicted in FIG. 3, may include multiple convolutional layers of neurons whereas each of the second subsystems 320-$x$ of the same MLM may include at least one fully connected layer of neurons. The second MLM may be a model trained separately from the first MLM. For example, the first MLM may be trained first and the second MLM may be trained using outputs of the first (already trained) MLM.

At an optional (as depicted by the dashed box) block 950, method 900 may continue with providing the image as an input (herein referred to as a third input) into a third MLM to obtain a set of additional feature vectors. Each of the additional feature vectors may be representative of a glare in the image. In implementations, in which the third MLM is deployed, the second input into the second MLM may include the set of the additional feature vectors output by the third MLM. In some implementations, the third MLM may be trained separately from (e.g., in parallel to) the first MLM. In some implementations, the second MLM may be trained using outputs of both (already trained) the first MLM and the second MLM. In some implementations, where a separate third MLM is not deployed, glare may be identified by the first MLM by outputting the glare feature vectors, as described above in conjunction with block 930.

At block 960, method 900 may continue with the processing device obtaining, using the second MLM, an indication of suitability of the image for OCR. The indication of suitability may include an image quality vector (e.g., image quality vector 580 in FIG. 5) which may identify locations in the image where various imaging imperfections exist, such as blur, defocusing, glare, and the like. The indication of suitability of the image may further identify locations where the text in the image is present and the size of that text. Additionally, the indication of suitability of the image may also include an image quality value (e.g., image quality value 590) representative of the overall (global) fitness of the image for OCR.

In some implementations, the one or more second feature vectors may include text size feature vectors which may be representative of the size of the text in the image. For example, the text sizes may include various values $T_{min}$, $T_1$, $T_2$, $T_3$, ... $T_{max}$. In some implementations, the text size $T_{min}$ may be too small for a reliable OCR while size $T_{max}$ may be too large. Having determined that the text size is suboptimal for a reliable OCR (either too small or too large), the processing device performing method 900 may resize the image to increase (if the determined text size is too small) or decrease (if the determined text size is too large) the resolution. Blocks 910-940 (and, optionally, block 950) may be then repeated for the resized image. In particular, the one or more first and the one or more second feature vectors may be reobtained for the resized image, with the text size now identified as one of more optimal sizes $T_1, T_2, T_3, \ldots$. The re-obtained feature vectors may then be used in block 960 to obtain the indication of suitability of the image for OCR.

At (optional) block 970, method 900 may continue with the processing device causing a display, on a user interface, of an image quality map for the image. In some implementations, the image quality map may include at least one of a blur map for the image, a defocusing map for the image, and or a glare map for the image. The image quality map may based, at least in part, on the first feature vector for each of at least some (e.g., a subplurality) of the plurality of patches of the image. For example, the image quality map may be determined by the second MLM by forming feature tensors based on the first feature vectors for patches of a given size and processing (e.g., by using convolutional neuron layers) the formed future tensors to extract the image quality map. As described in more detail in conjunction with FIG. 5, feature tensors for multiple patch sizes may be concurrently processed and then combined, for additional accuracy of image quality determination. In some implementations, the processing device performing method 900 may further cause a display of the text (presence and size) map for the image. The text map for the image may based, at least in part, on the second feature vector for each of at least some of the patches of the image. For example, as described in more detail in conjunction with FIG. 5, the feature tensors may be formed using the second feature vectors and, after processing, joined with the feature tensors formed using the first feature vectors. In such implementations, the text map for the image may be determined concurrently with determination of the image quality map.

At (optional) block 980, method 900 may continue with the processing device causing one or more recommendations to be presented on the user interface. The recommendation(s) may be based on the indication of suitability of the image for OCR. For example, a first recommendation that may be presented on the user interface may be to use the image for OCR, and may be made if the image quality value is at or above a certain threshold (e.g., a certain predicted amount of percentage of OCR errors). A second recommendation that may be presented on the user interface may to obtain a different image, and may be made if the image quality value is below the threshold.

FIG. 10 is flow diagram illustrating one example method 1000 of operations of an image quality prediction machine learning model, in accordance with some implementations of the present disclosure. The method 1000 may involve operations of the second MLM, e.g., QPM 126 in FIG. 1 or QPM 620 in FIG. 6. In some implementations, the method 1000 may be performed in conjunctions with method 900. At block 1010, the computing device performing method 1000 may obtain, based on the one or more first feature vectors and the one or more second feature vectors for each of the first subplurality of patches, a first feature tensor. For example, the first subplurality of patches may be patches of the 64×64 pixel size (or any other suitable size). As illustrated in FIG. 5, the first feature tensor may be joined feature tensor 530. At block 1020, the computing device performing method 1000 may obtain, based on the one or more first feature vectors and the one or more second feature vectors for each of the second subplurality of patches, a second feature tensor. For example, the second subplurality of patches may be patches of the 128×128 pixel size (or any other suitable size) and the second feature tensor may be joined feature tensor 531. At block 1030, the computing device performing method 1000 may obtain a recomputed first feature tensor using the first feature tensor and one or more convolution operations. More specifically, the recomputed first feature tensor may be obtained as a result of the recompute 532 operation that is performed using one or more convolutional layers of the second MLM. (The recompute 532 operation may further be performed using one or more padding layers.) At block 1040, the computing device performing method 1000 may obtain a recomputed second feature tensor using the second feature tensor and one or more additional convolution operations. More specifically, the recomputed second tensor may be obtained as a result of the recompute 533 operation that is performed using one or more additional convolutional layers of the second MLM. (The recompute 533 operation may also be performed using one or more padding layers.)

At block 1050, the computing device performing method 1000 may downsample the first feature tensor (e.g., the joined first feature tensor after the recompute 532 operation) from the first size of the first subplurality of patches to the second size of the second subplurality of patches. For example, the downsample 534 operation may produce the downsampled feature tensor 540. At block 1060, the computing device performing method 1000 may obtain a combined feature tensor (e.g., combined feature tensor 544) using the recomputed (and downsampled) first feature tensor (e.g., downsampled feature tensor 540) and the recomputed second feature tensor (e.g., joined feature tensor 531).

At block 1070, the computing device performing method 1000 may obtain the indication of suitability of the image for OCR. The suitability of the image for OCR (e.g., provided by image quality vector 580 and image quality value 590) may be based on the combined feature tensor (e.g., combined feature tensor 544). In some implementations, multiple additional operations may be performed on the combined feature tensor, such as additional convolutions, paddings, downsampling operations (e.g., to the scales that correspond to various lower-resolution size of patches), combining operations (e.g., with other feature tensors for other scales of the patches), and the like.

FIG. 11 is flow diagram illustrating one example method 1100 of training of an image quality prediction machine learning model, in accordance with some implementations of the present disclosure. The MLM trained according to method 1100 may be the second MLM. At block 1110, the computing device performing method 1100 may segment a training image (TI) into a plurality of patches. In some implementations, the plurality of patches may include various subpluralities of a particular size (e.g., 64×64 pixel patches, 128×128 pixel patches, and so on). For each of the plurality of patches of the TI the following operations may be performed.

At block 1120, the computing device performing method 1100 may obtain, using the first MLM and based on the one or more first feature vectors (e.g., one or more feature vectors 324-1, 324-2, or 324-3) for a respective patch of the TI, one or more corresponding first feature values (e.g., one or more feature values 328-1, 328-2, or 328-3). Each of the one or more first feature values may characterize at least one of a degree of a blur, a degree of defocusing, or a degree of a glare in the respective patch of the TI. At block 1130, the computing device performing method 1100 may obtain, using the first MLM and based on the one or more second feature vectors (e.g., one of feature vectors 324-4 or 324-5)

for the respective patch of the TI, one or more corresponding second feature values (e.g., one or more feature values 328-4 or 328-5). Each of the one or more second feature values may characterize at least one of a presence of a text in the respective patch of the TI or a size of the text in the respective patch of the TI. At block 1140, the computing device performing method 1100 may identify, one or more first target feature values and one or more second target feature values. The target feature values may be determined by examination of the target image.

At block 1150, the computing device performing method 1100 may adjust parameters (e.g., weights, biases, parameters of the activation functions, etc.) of the first MLM in view of a difference between each of the one or more first target feature values and a respective first feature value of the one or more first feature values, and a difference between each of the one or more second target feature values and a respective second feature value of the one or more second feature values.

Figure 12:
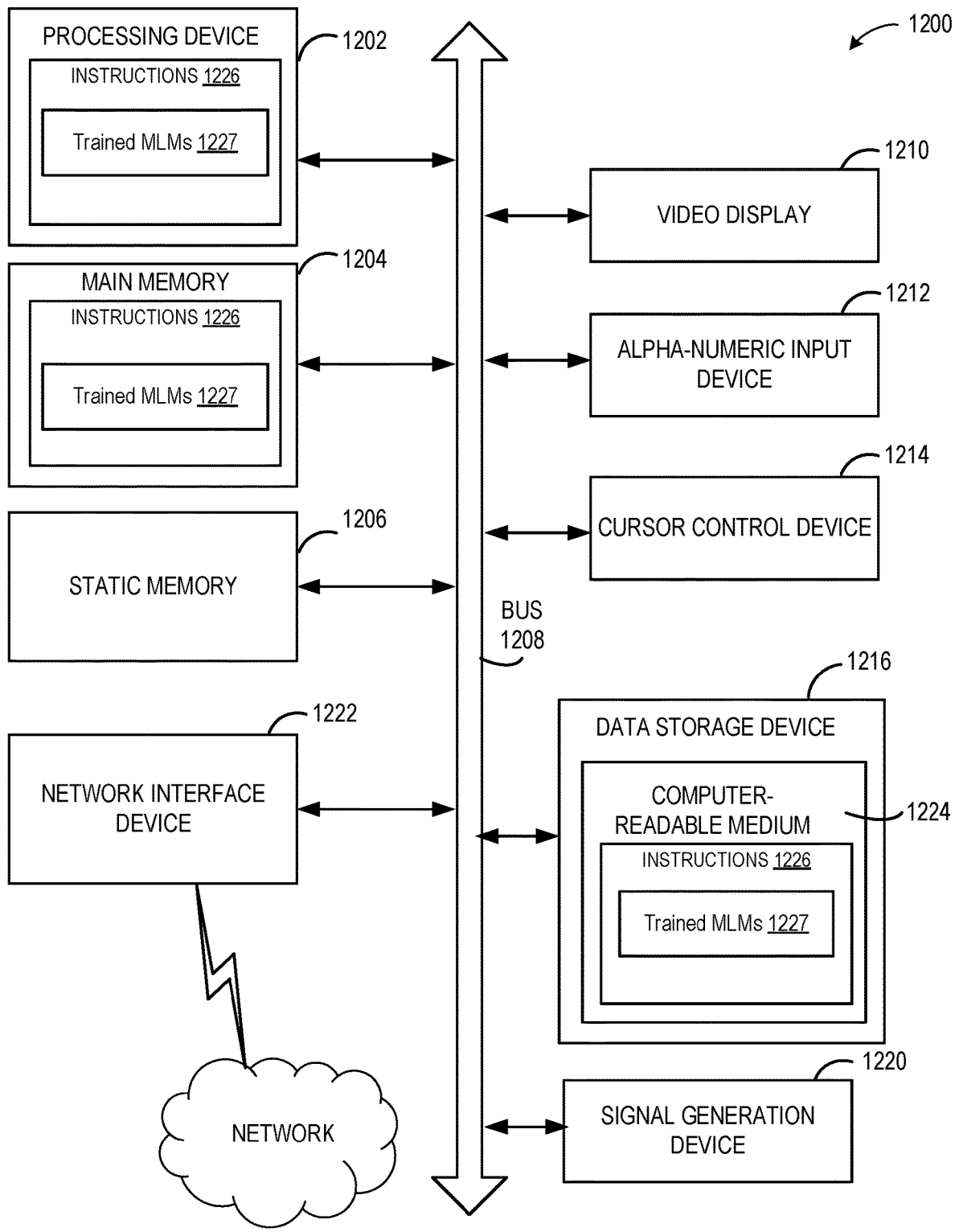
FIG. 12 illustrates a block diagram of a computer system in accordance with some implementations of the present disclosure.

FIG. 12 depicts an example computer system 1200 which can perform any one or more of the methods described herein. The computer system may be connected (e.g., networked) to other computer systems in a LAN, an intranet, an extranet, or the Internet. The computer system may operate in the capacity of a server in a client-server network environment. The computer system may be a personal computer (PC), a tablet computer, a set-top box (STB), a Personal Digital Assistant (PDA), a mobile phone, a camera, a video camera, or any device capable of executing a set of instructions (sequential or otherwise) that specify actions to be taken by that device. Further, while only a single computer system is illustrated, the term "computer" shall also be taken to include any collection of computers that individually or jointly execute a set (or multiple sets) of instructions to perform any one or more of the methods discussed herein.

The exemplary computer system 1200 includes a processing device 1202, a main memory 1204 (e.g., read-only memory (ROM), flash memory, dynamic random access memory (DRAM) such as synchronous DRAM (SDRAM)), a static memory 1206 (e.g., flash memory, static random access memory (SRAM)), and a data storage device 1216, which communicate with each other via a bus 1208.

Processing device 1202 represents one or more general-purpose processing devices such as a microprocessor, central processing unit, or the like. More particularly, the processing device 1202 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 1202 may also be one or more special-purpose processing devices such as an application specific integrated circuit (ASIC), a field programmable gate array (FPGA), a digital signal processor (DSP), network processor, or the like. The processing device 1202 is configured to execute instructions 1226 for implementing the trained MLMs 1227, such as the image characterization model 124 (or 610), the quality prediction model 126 (or 620), and/or the glare model 128 (or 630) of FIG. 1 (or FIG. 6) and to perform the operations discussed herein (e.g., operations of methods 900-1100 of FIGS. 9-11).

The computer system 1200 may further include a network interface device 1222. The computer system 1200 also may include a video display unit 1210 (e.g., a liquid crystal display (LCD) or a cathode ray tube (CRT)), an alphanumeric input device 1212 (e.g., a keyboard), a cursor control device 1214 (e.g., a mouse), and a signal generation device 1220 (e.g., a speaker). In one illustrative example, the video display unit 1210, the alphanumeric input device 1212, and the cursor control device 1214 may be combined into a single component or device (e.g., an LCD touch screen).

The data storage device 1216 may include a computer-readable medium 1224 on which is stored the instructions 1226 embodying any one or more of the methodologies or functions described herein. The instructions 1226 may also reside, completely or at least partially, within the main memory 1204 and/or within the processing device 1202 during execution thereof by the computer system 1200, the main memory 1204 and the processing device 1202 also constituting computer-readable media. In some implementations, the instructions 1226 may further be transmitted or received over a network via the network interface device 1222.

While the computer-readable storage medium 1224 is shown in the illustrative examples to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

Although the operations of the methods herein are shown and described in a particular order, the order of the operations of each method may be altered so that certain operations may be performed in an inverse order or so that certain operation may be performed, at least in part, concurrently with other operations. In certain implementations, instructions or sub-operations of distinct operations may be in an intermittent and/or alternating manner.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

In the above description, numerous details are set forth. It will be apparent, however, to one skilled in the art, that the aspects of the present disclosure may be practiced without these specific details. In some instances, well-known structures and devices are shown in block diagram form, rather than in detail, in order to avoid obscuring the present disclosure.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving," "determining," "selecting," "storing," "analyzing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer-readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description. In addition, aspects of the present disclosure are not described with reference to any particular programming language. It will be appreciated that a variety of programming languages may be used to implement the teachings of the present disclosure as described herein.

Aspects of the present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read-only memory ("ROM"), random access memory ("RAM"), magnetic disk storage media, optical storage media, flash memory devices, etc.).

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" or "an implementation" or "one implementation" throughout is not intended to mean the same implementation or implementation unless described as such. Furthermore, the terms "first," "second," "third," "fourth," etc. as used herein are meant as labels to distinguish among different elements and may not necessarily have an ordinal meaning according to their numerical designation.

Whereas many alterations and modifications of the disclosure will no doubt become apparent to a person of ordinary skill in the art after having read the foregoing description, it is to be understood that any particular implementation shown and described by way of illustration is in no way intended to be considered limiting. Therefore, references to details of various implementations are not intended to limit the scope of the claims, which in themselves recite only those features regarded as the disclosure.

What is claimed is:

1. A method, comprising:
   segmenting an image to obtain a plurality of patches;
   providing the segmented image as a first input into a first machine learning model (MLM);
   obtaining, using the first MLM, for each patch of the plurality of patches:
     one or more first feature vectors representative of reduction of imaging quality in a respective patch, and
     one or more second feature vectors representative of a text content of the respective patch;
   providing a second input into a second MLM, the second input comprising, for each patch of the plurality of patches, the one or more first feature vectors and the one or more second feature vectors; and
   obtaining, using the second MLM, an indication of suitability of the image for optical character recognition (OCR).

2. The method of claim 1, wherein each of the one or more first feature vectors is representative of at least one of:
   a blur in the respective patch,
   a defocusing in the respective patch, or
   a glare in the respective patch.

3. The method of claim 1, wherein each of the one or more second feature vectors is representative of at least one of:
   a presence of a text within the respective patch, or
   a size of the text within the respective patch.

4. The method of claim 1, further comprising:
   obtaining, based on the one or more second feature vectors, one or more corresponding second feature values, each of the one or more second feature values characterizing at least one of:
     a presence of a text in the respective patch, or
     a size of the text in the respective patch.

5. The method of claim 1, wherein the first MLM is trained, at least in part, by:
   segmenting a training image (TI) into a plurality of patches;
   for each of the plurality of patches of the TI:
     i) obtaining, using the first MLM and based on the one or more first feature vectors for a respective patch of the TI, one or more corresponding first feature values, each of the one or more first feature values characterizing at least one of:

a degree of a blur in the respective patch of the TI, or a degree of defocusing in the respective patch of the TI, and ii) obtaining, using the first MLM and based on the one or more second feature vectors for the respective patch of the TI, one or more corresponding second feature values, each of the one or more second feature values characterizing at least one of:

a presence of a text in the respective patch of the TI, or a size of the text in the respective patch of the TI, and iii) identifying, one or more first target feature values and one or more corresponding second target feature values; and adjusting parameters of the first MLM in view of:

a difference between each of the one or more first target feature values and a respective first feature value of the one or more first feature values, and a difference between each of the one or more second target feature values and a respective second feature value of the one or more second feature values.

6. The method of claim 1, wherein the plurality of patches comprises a first subplurality of patches of a first size and a second subplurality of patches of a second size that is different from the first size, the first subplurality of patches and the second subplurality of patches covering a common portion of the image.

7. The method of claim 6, wherein the first size is one of 64×64 pixels, 128×128 pixels, or 256×256 pixels, the second size is one of 128×128 pixels, 256×256 pixels, or 512×512 pixels, and wherein segmenting the image comprises:

grayscaling the image; and resizing the image to fit the image into an integer number of patches of the second size.

8. The method of claim 6, wherein the second MLM performs operations comprising:

obtaining, based on the one or more first feature vectors and the one or more second feature vectors for each of the first subplurality of patches, a first feature tensor;

obtaining, based on the one or more first feature vectors and the one or more second feature vector for each of the second subplurality of patches, a second feature tensor;

obtaining a recomputed first feature tensor using the first feature tensor and one or more convolution operations;

obtaining a recomputed second feature tensor using the second feature tensor and one or more additional convolution operations; and obtaining the indication of suitability of the image for OCR based on the recomputed first feature tensor and the recomputed second feature tensor.

9. The method of claim 8, wherein obtaining the indication of suitability of the image for OCR is based on a combined feature tensor obtained by combining the recomputed first feature tensor and the recomputed second feature tensor.

10. The method of claim 9, wherein obtaining the recomputed first feature tensor comprises downsampling the first feature tensor from the first size of the first subplurality of patches to the second size of the second subplurality of patches.

11. The method of claim 1, wherein the plurality of patches comprises at least four subpluralities of patches, wherein each of the subpluralities of patches comprises patches of a size that is different than sizes of other subpluralities of patches, and wherein all of the subpluralities of patches correspond to a common portion of the image.

12. The method of claim 1, wherein each of the first MLM and the second MLM comprises a neural network model having a plurality of layers of neurons.

13. The method of claim 12, wherein each of the first MLM and the second MLM is i) a fully convolutional neural network, or ii) a neural network having one or more convolutional layers of neurons and one or more fully connected layers of neurons.

14. The method of claim 1, further comprising:

providing the image as a third input into a third MLM to obtain a set of additional feature vectors, each of the additional feature vectors being representative of a glare in the image;

wherein the second input into the second MLM further comprises the set of the additional feature vectors.

15. The method of claim 1, further comprising:

based on the one or more second feature vectors, resizing the image to obtain a resized image; and re-obtaining the one or more first feature vectors and the one or more second feature vectors using the resized image; and wherein obtaining the indication of suitability of the image for OCR is based on the reobtained one or more first feature vectors and one or more second feature vectors.

16. The method of claim 1, further comprising:

based on the indication of suitability of the image for OCR, causing at least one of:

an automatic retaking of the image;

a presentation, on a user interface, of a first recommendation to use the image for OCR; or a presentation, on the user interface, of a second recommendation to retake the image.

17. The method of claim 1, further comprising:

causing a display, on a user interface, of an image quality map for the image, wherein the image quality map is based, at least in part, on the one or more first feature vectors for each of at least a subplurality of the plurality of patches of the image and comprises at least one of:

a blur map for the image, a defocusing map for the image, or a glare map for the image.

18. The method of claim 1, further comprising:

causing a display, on a user interface, of a text segmentation map of the image, wherein the text segmentation map is based, at least in part, on the one or more second feature vectors for each of at least a subplurality of the plurality of patches of the image.

19. The method of claim 1, wherein the plurality of patches corresponds to regions of the image selected randomly or according to a pre-determined geometric pattern.

20. A non-transitory machine-readable storage medium including instructions that, when accessed by a processing device, cause the processing device to:

segment an image to obtain a plurality of patches;

provide the segmented image as a first input into a first machine learning model (MLM);

obtain, using the first MLM, for each patch of the plurality of patches:

one or more first feature vectors representative of reduction of imaging quality in a respective patch, and one or more second feature vectors representative of a text content of the respective patch;

provide a second input into a second MLM, the second input comprising, for each patch of the plurality of patches, the one or more first feature vectors and the one or more second feature vectors; and obtain, using the second MLM, an indication of suitability of the image for optical character recognition (OCR).

21. A system comprising:
a memory; and
a processing device operatively coupled to the memory, the processing device to:
  segment an image to obtain a plurality of patches;
  provide the segmented image as a first input into a first machine learning model (MLM);
  obtain, using the first MLM, for each patch of the plurality of patches:
    one or more first feature vectors representative of reduction of imaging quality in a respective patch, and
    one or more second feature vectors representative of a text content of the respective patch;
  provide a second input into a second MLM, the second input comprising, for each patch of the plurality of patches, the one or more first feature vectors and the one or more second feature vectors; and
obtain, using the second MLM, an indication of suitability of the image for optical character recognition (OCR).

* * * * *